(12) United States Patent
Ohno et al.

(10) Patent No.: US 8,074,244 B2
(45) Date of Patent: Dec. 6, 2011

(54) RECEIVING APPARATUS AND METHOD

(75) Inventors: Tomoyuki Ohno, Kanagawa (JP); Yoshikazu Shibamiya, Tokyo (JP); Yuichi Matsumoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 639 days.

(21) Appl. No.: 12/179,689

(22) Filed: Jul. 25, 2008

(65) Prior Publication Data

US 2008/0282292 A1 Nov. 13, 2008

Related U.S. Application Data

(62) Division of application No. 10/717,560, filed on Nov. 21, 2003, now abandoned.

(30) Foreign Application Priority Data

Nov. 29, 2002 (JP) .................................. 2002-348722
Oct. 8, 2003 (JP) .................................. 2003-349769

(51) Int. Cl.
*H04N 5/445* (2011.01)
*G06F 3/00* (2006.01)
*G06F 13/00* (2006.01)

(52) U.S. Cl. ................ 725/49; 725/40; 725/41; 725/43; 725/44; 725/47; 725/48; 725/50; 725/52; 725/53; 725/54; 725/56; 725/59; 725/61

(58) Field of Classification Search .............. 725/40–41, 725/43–50, 52–54, 56, 59, 61; 375/240.25, 375/240.28
See application file for complete search history.

(56) References Cited

U.S. PATENT DOCUMENTS

| | | | |
|---|---|---|---|
| 5,933,192 A | 8/1999 | Crosby et al. | 348/387 |
| 6,115,080 A | 9/2000 | Reitmeier | 348/731 |
| 6,144,400 A | 11/2000 | Ebisawa | 348/7 |
| 6,204,887 B1 * | 3/2001 | Hiroi | 348/565 |
| 6,295,646 B1 * | 9/2001 | Goldschmidt Iki et al. | 725/41 |
| 6,405,371 B1 * | 6/2002 | Oosterhout et al. | 725/39 |
| 6,425,129 B1 * | 7/2002 | Sciammarella et al. | 725/38 |
| 6,931,660 B1 * | 8/2005 | Kalluri et al. | 725/131 |
| 7,142,777 B1 | 11/2006 | Ohno | 386/95 |
| 7,174,512 B2 * | 2/2007 | Martin et al. | 715/719 |
| 7,197,231 B2 | 3/2007 | Hoshi et al. | 386/83 |
| 7,650,626 B2 * | 1/2010 | Suh | 725/139 |
| 7,873,972 B2 * | 1/2011 | Zaslavsky et al. | 725/41 |
| 2002/0019982 A1 | 2/2002 | Aratani et al. | 725/59 |
| 2002/0021373 A1 | 2/2002 | Shibamiya | 348/734 |
| 2002/0066101 A1 * | 5/2002 | Gordon et al. | 725/43 |
| 2002/0089610 A1 | 7/2002 | Ohno et al. | 348/734 |

(Continued)

FOREIGN PATENT DOCUMENTS

JP 09-149402 6/1997

(Continued)

*Primary Examiner* — Jason Salce
(74) *Attorney, Agent, or Firm* — Fitzpatrick, Cella, Harper & Scinto

(57) ABSTRACT

Partial data related to information data is received, image data corresponding to the received partial data is generated by sequentially processing the received partial data, and the generated image data is output to a display unit. Before output of the image data corresponding to the partial data to the display unit is completed, reception of the information data is started. Then, image data corresponding to the information data is generated by processing the received information data, and image data to be displayed on said display unit is switched to the image data corresponding to the information data from the image data corresponding to the partial data after the reception of the information data is started.

6 Claims, 27 Drawing Sheets

U.S. PATENT DOCUMENTS

| | | |
|---|---|---|
| 2002/0095683 A1 | 7/2002 | Watanabe .................. 725/90 |
| 2002/0138829 A1 | 9/2002 | Matsumoto et al. ........... 725/14 |
| 2002/0194608 A1* | 12/2002 | Goldhor .................... 725/91 |
| 2004/0037449 A1* | 2/2004 | Davis et al. ................ 382/100 |
| 2004/0049788 A1 | 3/2004 | Mori et al. ................. 725/58 |
| 2004/0148629 A1 | 7/2004 | Shibamiya et al. ........... 725/53 |
| 2005/0081244 A1 | 4/2005 | Barrett et al. ............... 725/97 |
| 2007/0165139 A1* | 7/2007 | Eleftheriadis et al. ........ 348/565 |

FOREIGN PATENT DOCUMENTS

| | | |
|---|---|---|
| JP | 2000-339857 | 12/2000 |
| JP | 2002-091863 | 3/2002 |
| JP | 2002-118553 | 4/2002 |

* cited by examiner

FIG. 11
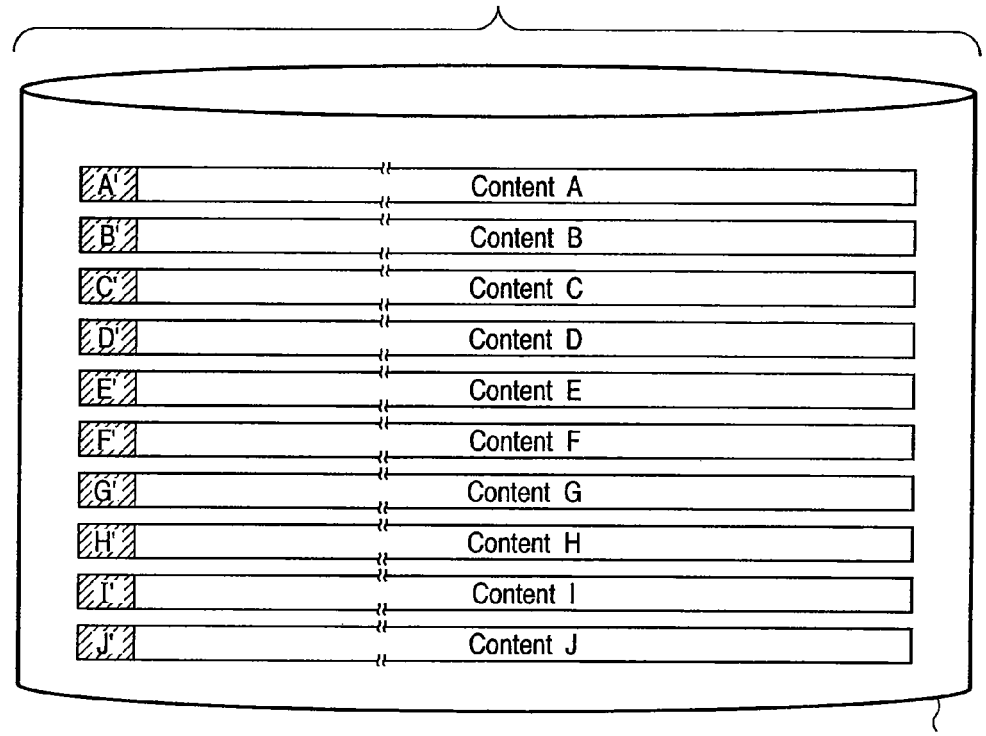
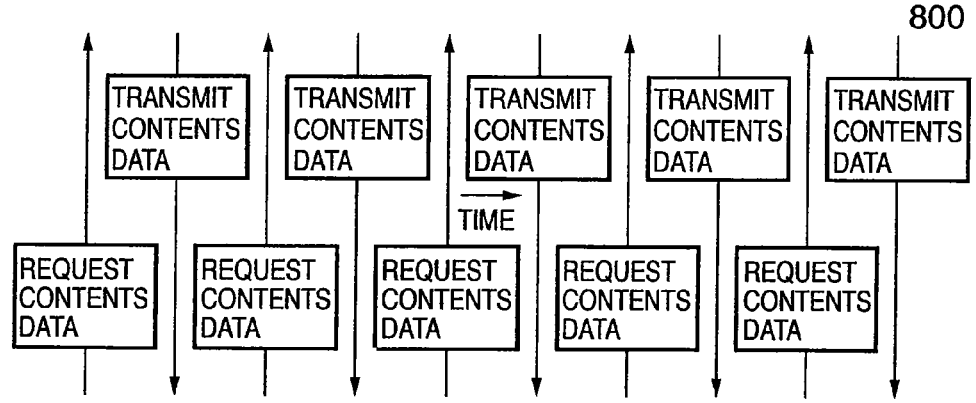
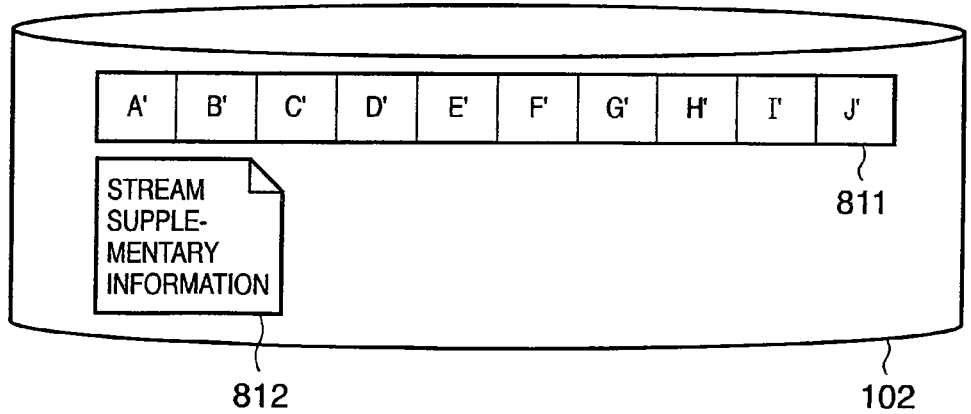

FIG. 12

```xml
<?xml version="1.0" encoding="shift-JIS"?>
<zapping_content_list>
  <zapping_stream_name>zap0001.strm</zapping_stream_name>
  <number_of_content>10</number_of_content>
  <content_capacity>60000000</content_capacity>
  <content_life>3600</content_life>
  <original_content>
  <component_index>00000000</component_index>
  <original_name>content A</original_name>
  <original_comment>THIS IS A MOVIE "CONTENT A".</original_comment>
  <original_genre>MOVIE</original_genre>
  <original_bitrate>300000</original_bitrate>
  <original_url>rtsp://canon.jpn/stream/recomend/contentA.strm/</original_url>
  <component_capacity>6000000</component_capacity>
  </original_content>
  <original_content>
  <component_index>00000001</component_index>
  <original_name>content B</original_name>
  <original_comment>THIS IS A MOVIE "CONTENT B".</original_comment>
  <original_genre>MOVIE</original_genre>
  <original_bitrate>300000</original_bitrate>
  <original_url?rtsp://canon.jpn/stream/recomend/contentB.strm/</original_url>
  <component_capacity>6000000</component_capacity>
  </original_content>
```

<- OMITTED - SIMILAR DESCRIPTION ABOUT CONTENTS C TO H>

```xml
  <original_content>
  <component_index>00000008</component_index>
  <original_name>content I</original_name>
  <original_coment>THIS IS NEWS "CONTENT I".</original_comment>
  <original_genre>NEWS/REPORT</original_genre>
  <original_bitrate>300000</original_bitrate>
  <original_url>rtsp://canon.jpn/stream/recomend/contentI.strm/</original_url>
  <component_capacity>6000000</component_capacity>
  </original_content>
  <original_content>
  <component_index>00000009</component_index>
  <original_name>content J</original_name>
  <original_comment>THIS IS A PROGRAM REPORTING "CONTENT J".</original_comment>
  <original_genre>NEWS/REPORT</original_genre>
  <original_bitrate>300000</original_bitrate>
  <original_url>rtsp://canon.jpn/stream/recomend/contentJ.strm/</original_url>
  <component_capacity>6000000</component_capacity>
  </original_content>
</zapping_content_list>
```

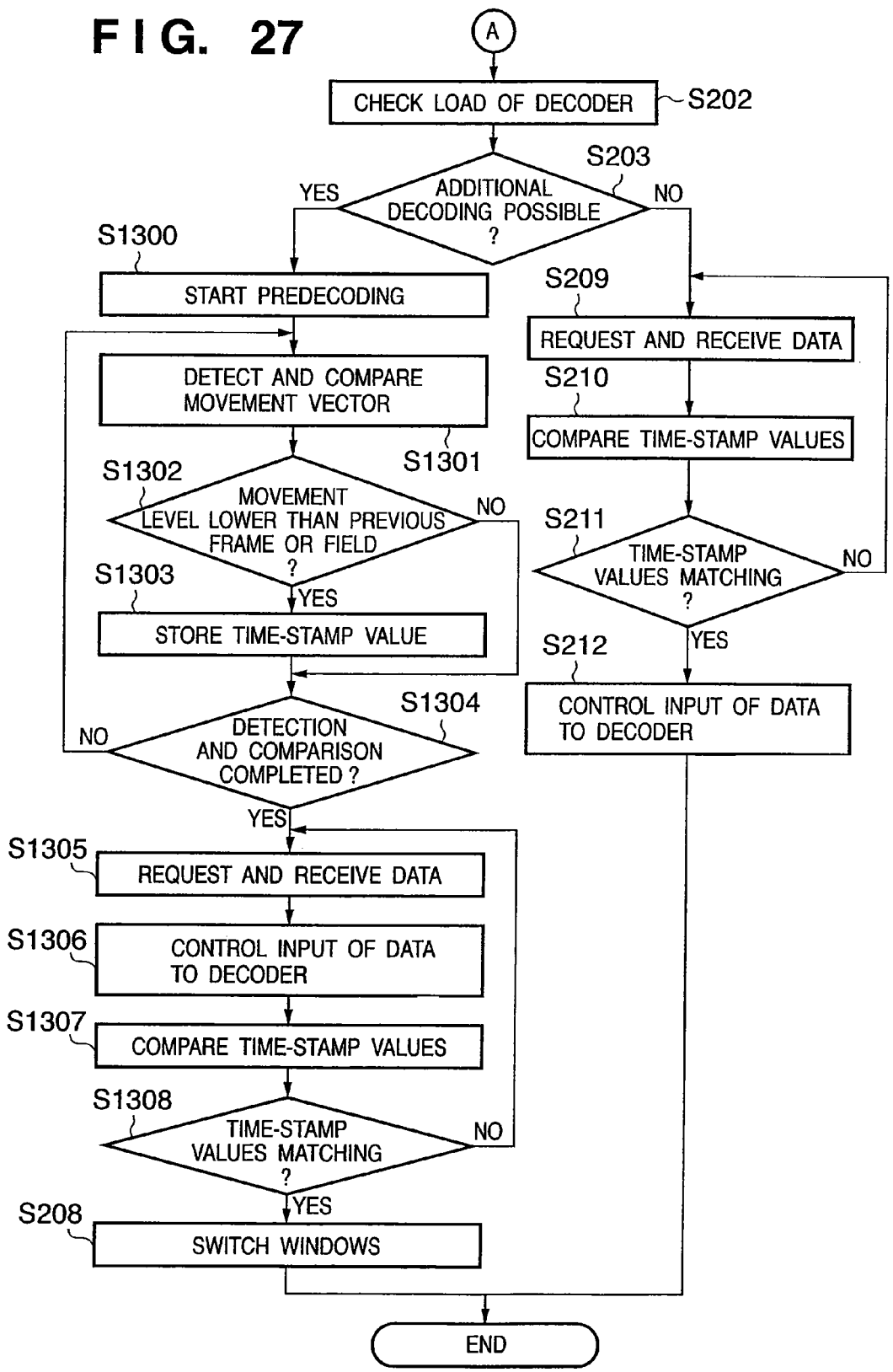

RECEIVING APPARATUS AND METHOD

This application is a division of application Ser. No. 10/717,560 filed Nov. 21, 2003.

FIELD OF THE INVENTION

The present invention relates to a receiving apparatus and a receiving method which are used with a computer, a television set, a settop box, an image recording/replaying device, etc., connected to a network and capable of receiving various data from the network, and outputting image data relating to the received data on a display. More particularly, the present invention relates to a receiving apparatus and a receiving method for streaming data through a network.

BACKGROUND OF THE INVENTION

With rapid progress of the technology of compressing moving pictures and voice data, the high-speed data transmission technology using XDSL, optical fiber, etc., and widespread infrastructures, streaming replay for sequentially replaying moving picture data and voice data on a server on the Internet (hereinafter referred to as streaming contents) while receiving the data over the network has made remarkable progress. In the streaming replay, a user can enjoy the streaming contents on the server at any time.

On the other hand, as a broadcast system, a system of transmitting a program digest through a unicast at a request from a user on the sending side, and starting receiving program data transmitted through a broadcast after the transmission of the digest in the receiving side has been proposed (Japanese Patent Application Laid-open No. 2002-118553).

There is also a system proposed for a case in which, when replaying of a recorded portion of contents is started while the contents are being recorded, the time to replay the recorded portion is shortened, and when the replaying of the recorded portion is finished, control is switched to replay the contents being broadcast (Japanese Patent Application Laid-open No. 2000-339857).

When one of two pieces of image data which are related to each other is replayed and the other piece of image data is consecutively replayed thereafter, changeover from the former image to the latter image may not be performed smoothly, which may disturb a viewer to enjoy the images.

SUMMARY OF THE INVENTION

The present invention aims at providing a viewer with a receiving apparatus and a receiving method capable of displaying smooth images by maintaining the continuity of replayed images when two pieces of image data related to each other are consecutively displayed on the same display.

According to the present invention, the foregoing object is attained by providing a receiving apparatus, comprising:
 a reception unit capable of independently receiving information data and partial data related to the information data;
 an information processing unit which processes the received data, generates image data corresponding to the received data, and outputs the image data to a display unit; and
 a controller which controls the information processing unit to process the partial data, and controls the reception unit to start receiving the information data before output of image data corresponding to the partial data to the display unit is completed,
 wherein the controller controls output of the information processing unit such that image data displayed on the display unit is switched to image data corresponding to the information data from image data corresponding to the partial data after reception of the information data is started.

According to the present invention, the foregoing object is also attained by providing a receiving method comprising:
 receiving partial data related to information data;
 generating image data corresponding to the partial data by sequentially processing the received partial data and outputting the image data to a display unit;
 starting reception of the information data before output of the image data corresponding to the partial data to the display unit is completed;
 generating image data corresponding to the information data by processing the received information data; and
 switching image data to be displayed on the display unit to the image data corresponding to the information data from the image data corresponding to the partial data after the reception of the information data is started.

According to the present invention, the foregoing object is also attained by providing a receiving apparatus, comprising:
 a reception unit which receives a plurality of information data streams through a network;
 an information processing unit which generates image data corresponding to the information data stream by processing the information data, and outputting the image data to a display unit;
 a generation unit which receives partial data of a plurality of information data streams through the reception unit, and generates a composite stream formed by plural pieces of received partial data;
 an accumulation unit which accumulates the composite stream generated by the generation unit;
 an instruction unit which selects one of the plurality of information data streams, and designates reception of the selected information data stream; and
 a controller which reads partial data corresponding to the information data stream designated by the instruction unit from the composite stream accumulated in the accumulation unit, outputs the read data to the information processing unit, and outputs the processed partial data to the display unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows the concept of configuration of the zapping stream according to the first embodiment of the present invention;

FIG. 12 shows an example of the zapping stream supplementary information data according to the first embodiment of the present invention;

FIG. 27 is a flowchart of the contents replay process according to the fifth embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
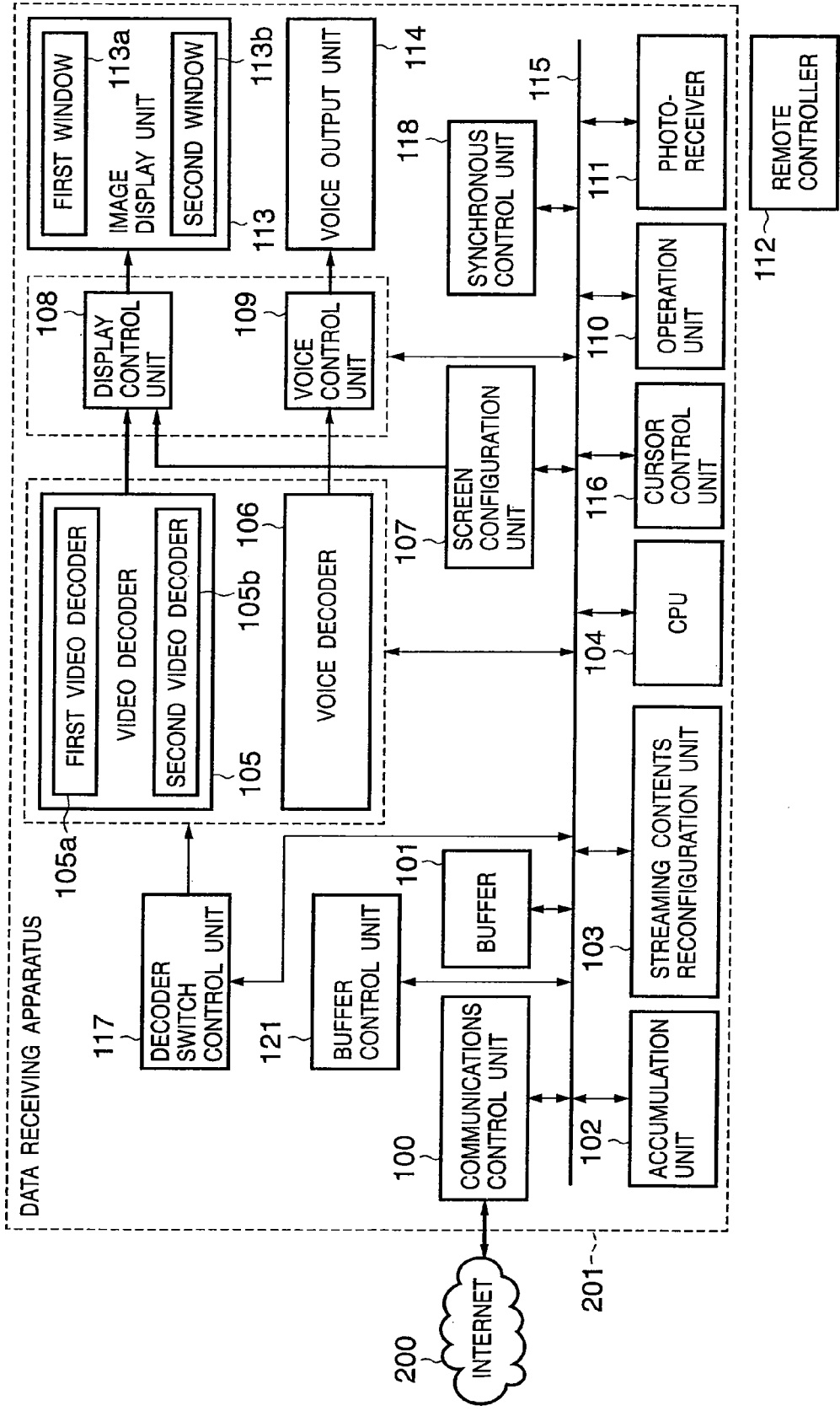
FIG. 1 is an block diagram illustrating the entire configuration of the data receiving apparatus according to a first embodiment of the present invention.

FIG. 1 is a block diagram illustrating the entire configuration of the data receiving apparatus according to the first embodiment of the present invention.

In FIG. 1, a network 200 (the Internet according to the first embodiment of the present invention) transmits streaming contents information, streaming contents, etc. A data receiving apparatus 201 comprises a communications control unit 100 for communications with the network 200, a buffer 101, an accumulation unit 102, a streaming contents reconfiguration unit 103, a CPU 104, a video decoder 105, a voice decoder 106, a screen configuration unit 107, a display control unit 108, a voice control unit 109, an operation unit 110, a photoreceiver 111, an image display unit 113, a voice output unit 114, a control bus 115, a cursor control unit 116, a decoder switch control unit 117, a synchronous control unit 118, and a buffer control unit 121. The video decoder 105 comprises a first video decoder 105a and a second video decoder 105b. The image display unit 113 comprises a first window 113a and a second window 113b. A remote controller 112 is for remotely operating a data receiving apparatus 201.

Figure 2:
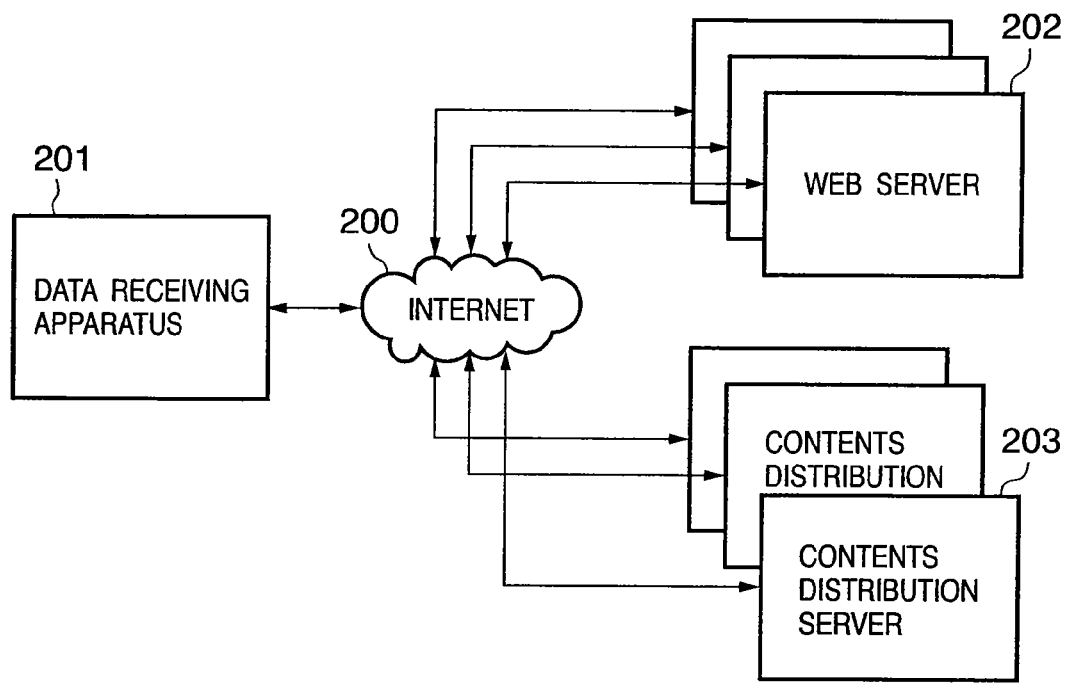
FIG. 2 shows the configuration of the entire system according to the first embodiment of the present invention.

FIG. 2 shows the configuration of the entire system according to the first embodiment of the present invention. In FIG. 2, the Internet 200 transmits streaming contents information, streaming contents, etc. as described above. The data receiving apparatus 201 having the configuration shown in FIG. 1 receives streaming contents information and streaming contents through the Internet 200. A Web server 202 distributes streaming contents information to the data receiving apparatus 201 through the Internet 200. A contents distribution server 203 distributes streaming contents to the data receiving apparatus 201 through the Internet 200. Actually, a plurality of Web servers 202 and contents distribution servers 203 are arranged on the Internet 200.

With the above-mentioned configuration, the communications control unit 100 communicates data with the Web server 202 and the contents distribution server 203 through the Internet 200. A buffer control unit 121 controls buffering to the buffer 101 of plural pieces of streaming contents data from the communications control unit 100 and the accumulation unit 102. The buffer 101 temporarily buffers plural pieces of streaming contents data. It should be noted that the communications control unit 100, the buffer control unit 121, the buffer 101, and the accumulation unit 102 can collectively form a communications unit.

The decoder switch control unit 117 switches the data destination (the first video decoder 105a or the second video decoder 105b) of the data from the buffer 101 to the video decoder 105. The video decoder 105 has the capability of simultaneously decoding a plurality of streaming contents using the first video decoder 105a and the second video decoder 105b. The display control unit 108 controls for display of plural pieces of decoded contents data from the video decoder 105 in a plurality of display windows (the first windows 113a and 113b) of the image display unit 113.

The video decoder 105, the display control unit 108, the decoder switch control unit 117, etc. form an information processing unit.

The control bus 115 is a bus line for use by the CPU 104 controlling each function block shown in FIG. 1. The accumulation unit 102 accumulates a zapping stream generated by the streaming contents reconfiguration unit 103. The streaming contents reconfiguration unit 103 configures a zapping stream from a plurality of received streaming contents. The CPU 104 as a control unit controls each block in the data receiving apparatus 201 through the control bus 115. The synchronous control unit 118 is described later. The operation unit 110 is provided with a button, etc. for performing an operation of the data receiving apparatus by a user, and is explained below by referring to FIG. 3.

Figure 3:
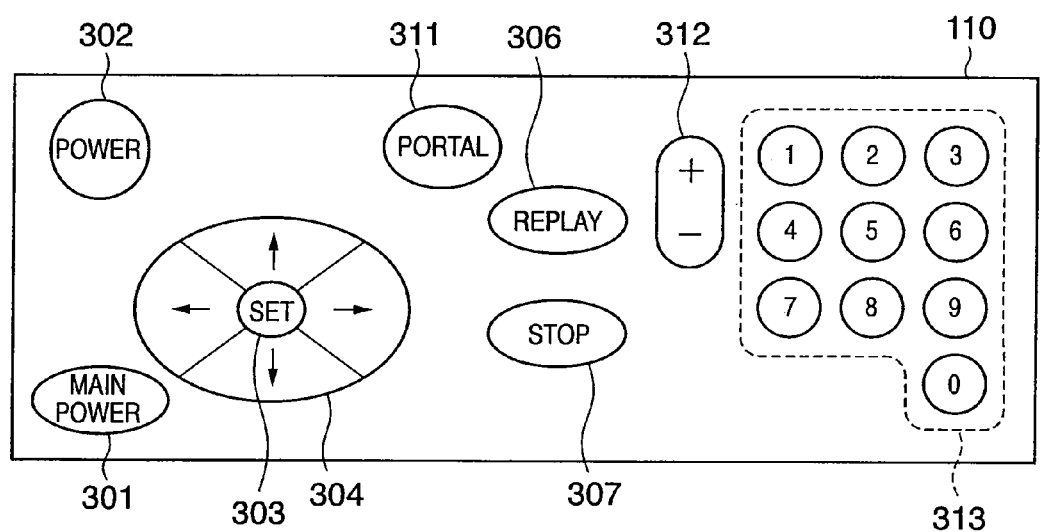
FIG. 3 shows the configuration of the operation unit shown in FIG. 1.
Figure 4:
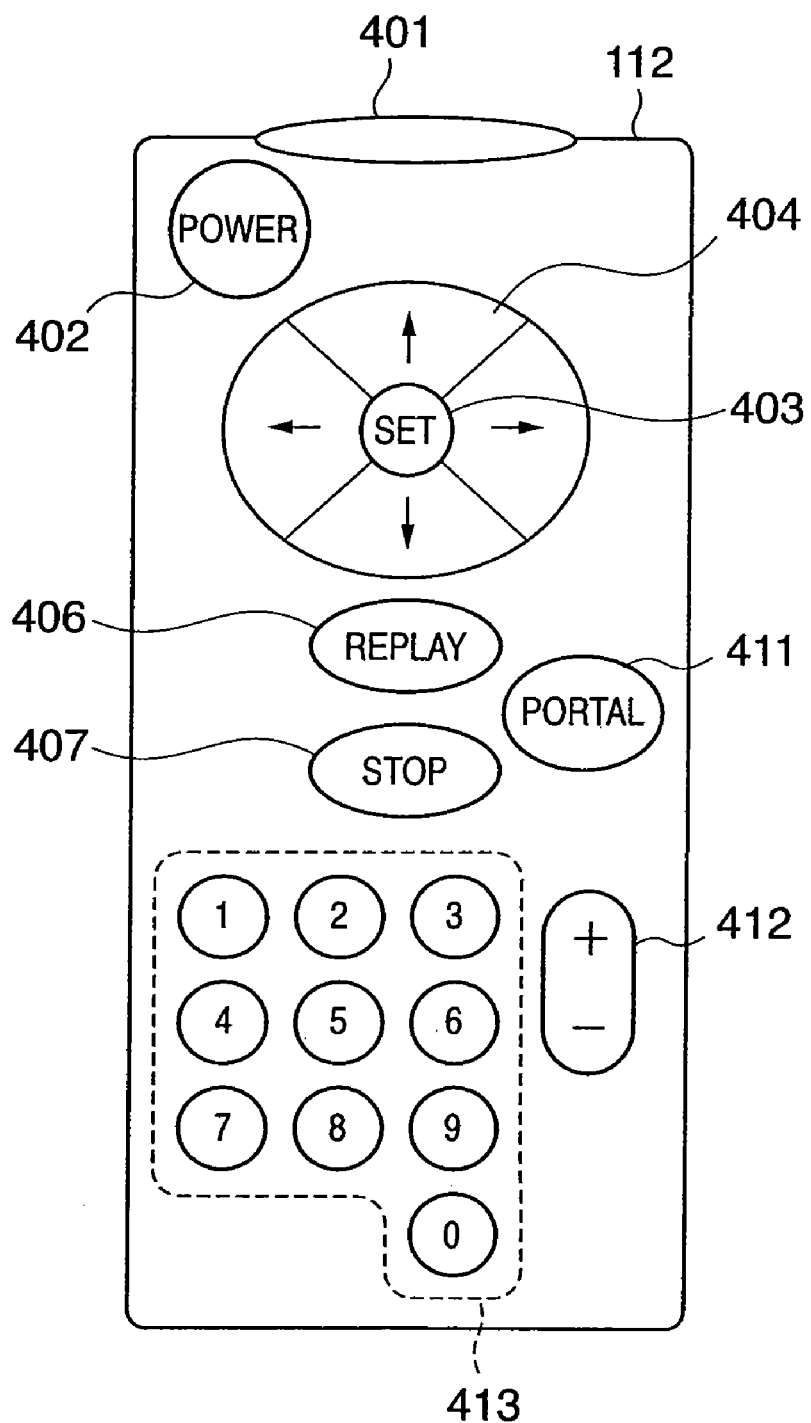
FIG. 4 shows the configuration of the remote controller shown in FIG. 1.

FIG. 3 shows the configuration of the operation unit 110. FIG. 4 shows the configuration of the remote controller 112.

FIG. 3 shows a main power button 301, a power button 302, a set button 303, cursor buttons 304, a replay button 306, a stop button 307, a portal button 311, a channel up/down button 312, and a ten-key 313. FIG. 4 shows a transmission unit 401, a power button 402, a set button 403, cursor buttons 404, a replay button 406, a stop button 407, a portal button 411, a channel up/down button 412, and a ten-key 413.

In FIGS. 3 and 4, the same names refer to the same functions. A signal indicating each button operation using the remote controller 112 by a user is received by the photoreceiver 111 of the data receiving apparatus 201 through the transmission unit 401 shown in FIG. 4.

The main power button 301 shown in FIG. 3 is a button for control of the energization of each block in the data receiving apparatus 201 shown in FIG. 1. When the main power button 301 is turned on, the communications control unit 100, the buffer control unit 121, the buffer 101, the accumulation unit 102, the streaming contents reconfiguration unit 103, the CPU 104, the operation unit 110, and the photoreceiver 111 are energized. The power button 302 shown in FIG. 3 and the power button 402 shown in FIG. 4 are also the buttons for control of the energization of each block in the data receiving apparatus 201 shown in FIG. 1. When the power button 302 or 402 is turned on with the main power button 301 placed in the on state, the decoder switch control unit 117, the video decoder 105, the voice decoder 106, the screen configuration unit 107, the display control unit 108, the voice control unit 109, the image display unit 113, the voice output unit 114, the cursor control unit 116, and the synchronous control unit 118 are energized. The remote controller 112 is operated independent of the data receiving apparatus 201 by power supply means such as batteries, etc.

Figure 5:
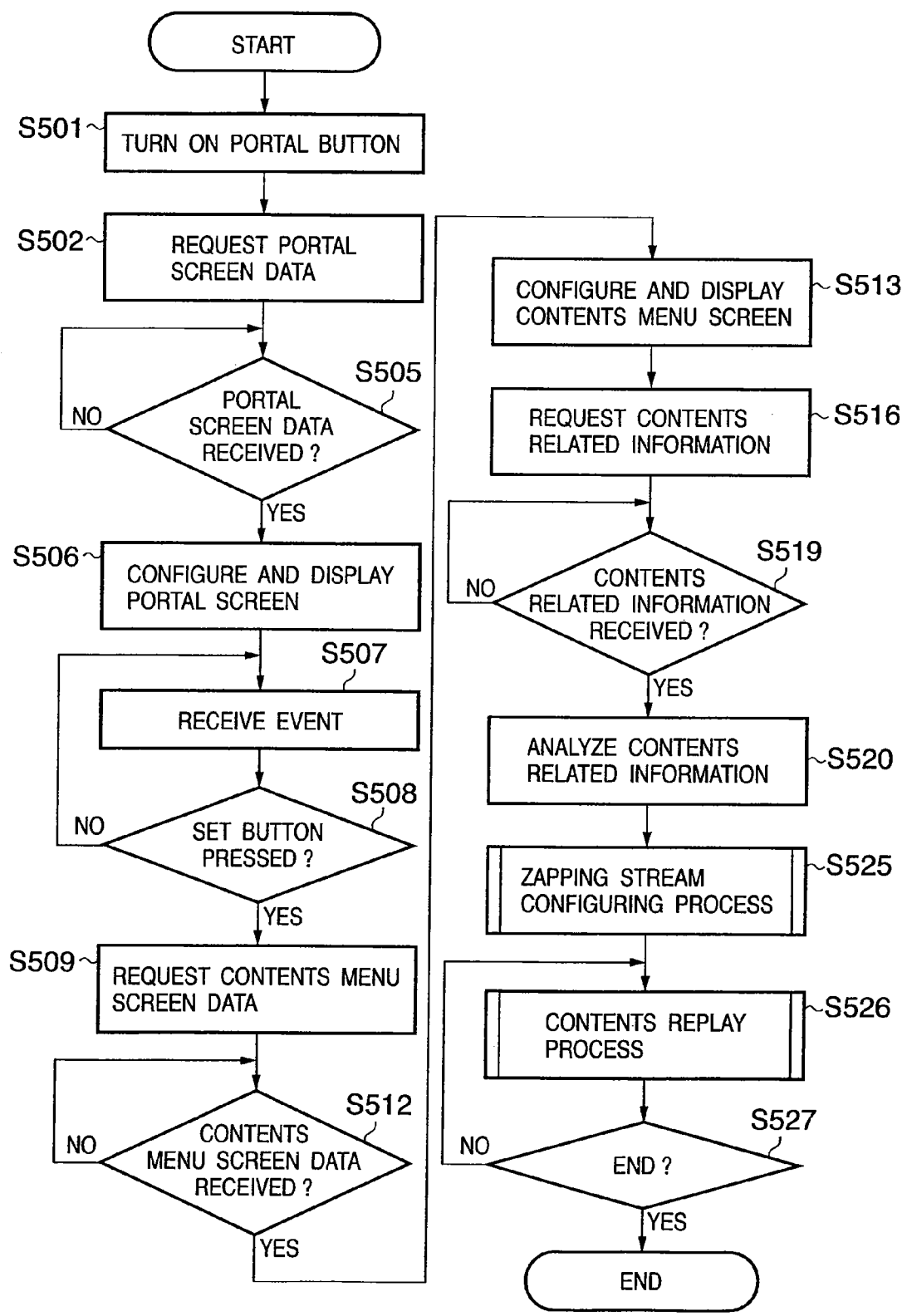
FIG. 5 is a flowchart of the operation of the data receiving apparatus according to the first embodiment of the present invention.
Figure 6:
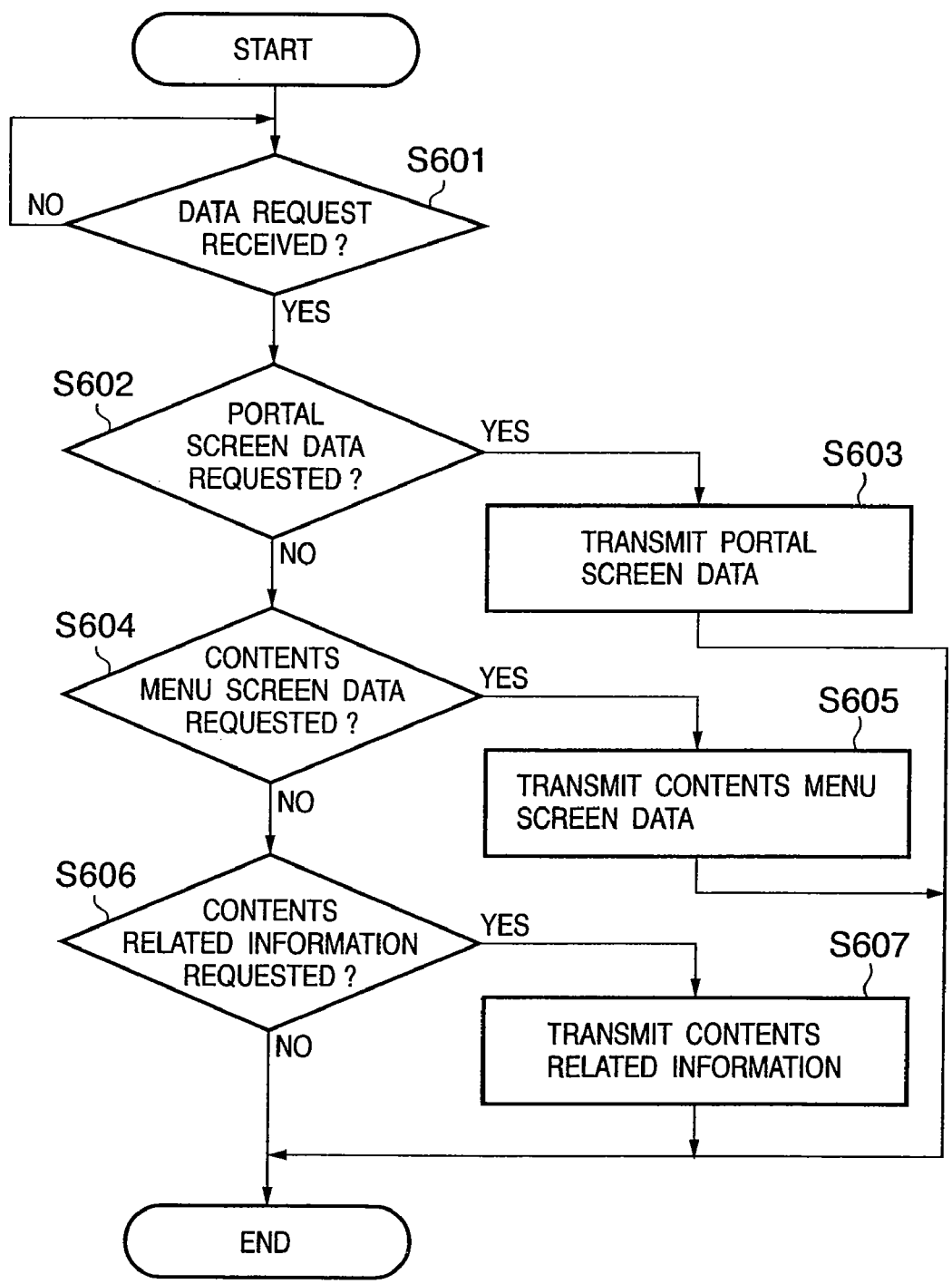
FIG. 6 is a flowchart of the data distributing operation to the data receiving apparatus in a Web server.
Figure 7:
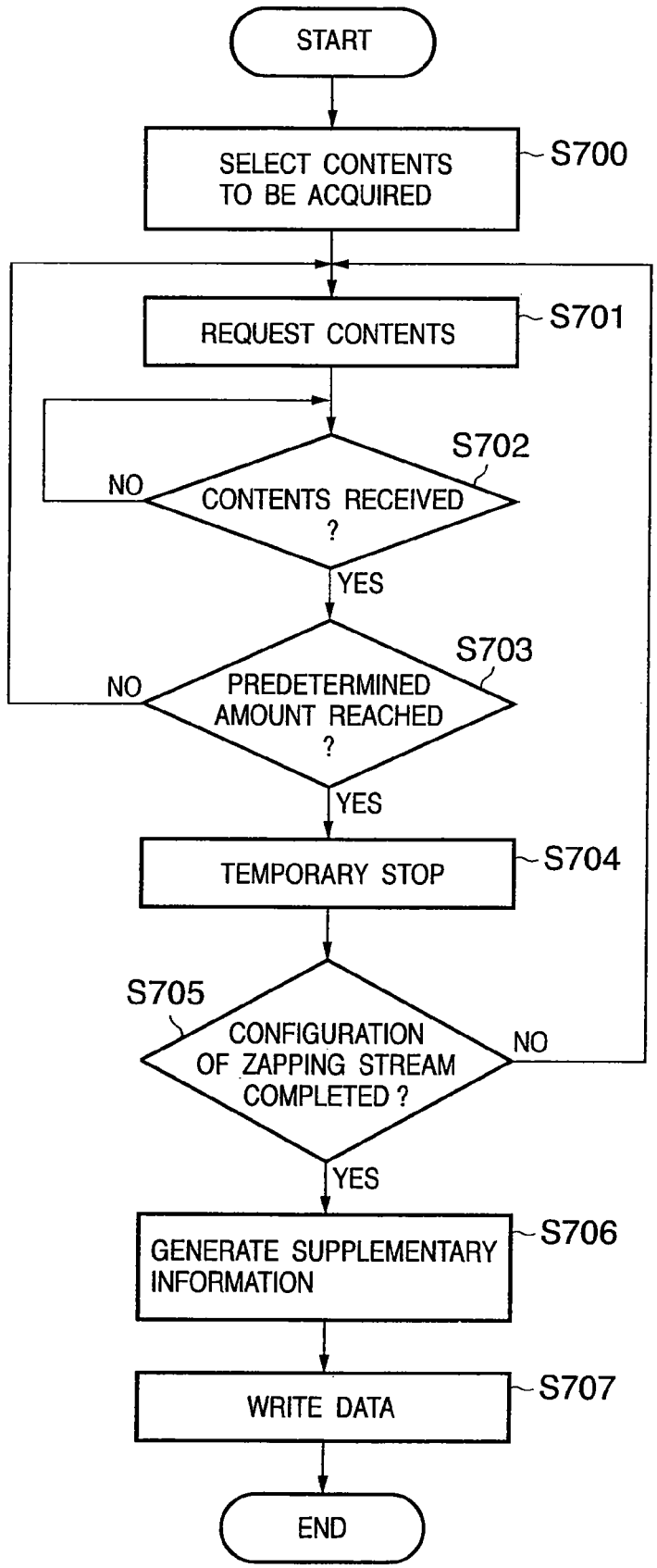
FIG. 7 is a flowchart of the process of configuring the zapping stream according to the first embodiment of the present invention.
Figure 8:
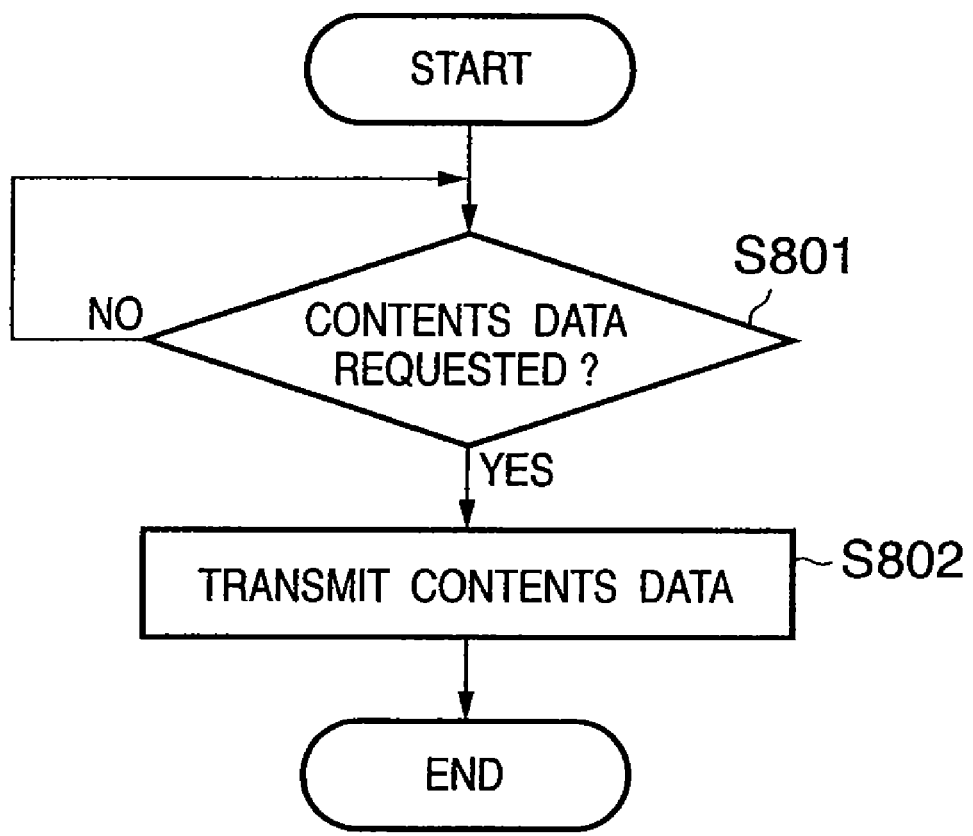
FIG. 8 is a flowchart of the data distributing operation to the data receiving apparatus in a contents distribution server.

FIG. 5 is a flowchart of the operation of the data receiving apparatus 201 according to the first embodiment of the present invention. FIG. 6 is a flowchart of the data distributing operation to the data receiving apparatus 201 in a Web server 202. FIG. 7 is a flowchart of the process of configuring a zapping stream. FIG. 8 is a flowchart of the data distributing operation to the data receiving apparatus 201 in a contents distribution server 203. The operations and processes are described below by following the flowcharts in FIGS. 5 to 8, and by referring to FIGS. 1 to 4.

When a user presses the portal button 311 or 411 with the power button 302 or 402 placed in the on state (step S501), the CPU 104 controls the communications control unit 100 through the control bus 115, connects it to the Web server 202 in the Internet 200, and makes a data request for portal screen data of the streaming contents (step S502).

The Web server 202 receives the data request from the data receiving apparatus 201 (YES in step S601 shown in FIG. 6), recognizes it as a request for portal screen data (YES in step S602), and transmits the requested portal screen data in step S603. The data distributed from the Web server 202 is described in the page description language such as the xHTML, etc.

The data receiving apparatus 201 awaits the portal screen data in step S505, and receives the portal screen data transmitted from the Web server 202.

Figure 9:
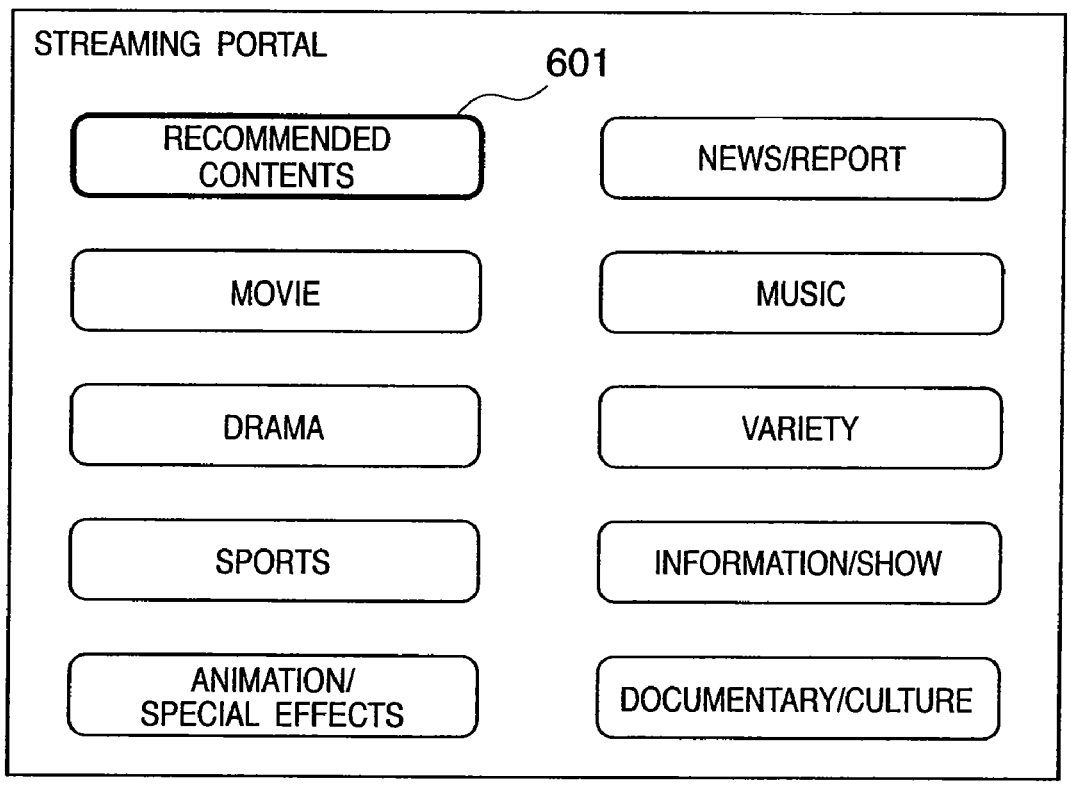
FIG. 9 shows an example of the portal screen according to the first embodiment of the present invention.

Control is passed to step S506 when the portal screen data is received, and the CPU 104 transmits the received data to the screen configuration unit 107 which forms the screen data to be displayed on the image display unit 113, and the formed screen data is displayed on the image display unit 113 through the display control unit 108. FIG. 9 shows an example of the display screen based on the screen data formed by the screen configuration unit 107. While watching the portal screen to the streaming contents, the user can select a desired category of contents. In FIG. 9, a cursor 601 is configured and controlled by the cursor control unit 116. The cursor 601 can be moved by the operation of the cursor buttons 304 or 404. For example, by pressing the down arrow button of the cursor buttons 304 or 404 when the displayed screen image is as shown in FIG. 9, the cursor 601 can be moved from the current "recommended contents" position to the "movie" position.

In step S507, upon receipt of an operation event by a user on the cursor buttons 304 or 404 and the set button 303 or 403 of the operation unit 110 or the remote controller 112, the CPU 104 discriminates the received event, that is, recognizes it as a movement of the cursor in the vertical direction or in the horizontal direction, a press of the set button 303 or 403, etc., and displays an image after the cursor is moved on the image display unit 113 through the cursor control unit 116, the screen configuration unit 107, the display control unit 108, and the image display unit 113. In step S508, it is determined whether or not the received event is a press on the set button 303 or 403. If NO, control is returned to step S507 and awaits the next event. If YES, control is passed to step S509.

In step S509, the contents menu screen data selected in steps S507 and S508 is requested by the operation of the equipment control task different from the operation in steps S507 and S508. That is, the position of the cursor 601 shown in FIG. 9 is linked with the request for the contents menu screen data requested in step S509. For example, in the cursor display position shown in FIG. 9, the Web server 202 is requested for the contents menu screen data relating to the "recommended contents".

The Web server 202 receives the data request from the data receiving apparatus 201 (YES in step S601 shown in FIG. 6). If it recognizes the received request as a request for the contents menu screen data (YES in step S604), then transmits the requested contents menu screen data in step S605.

The data receiving apparatus 201 awaits the contents menu screen data in step S512, and receives the contents menu screen data transmitted from the Web server 202.

Figure 10:
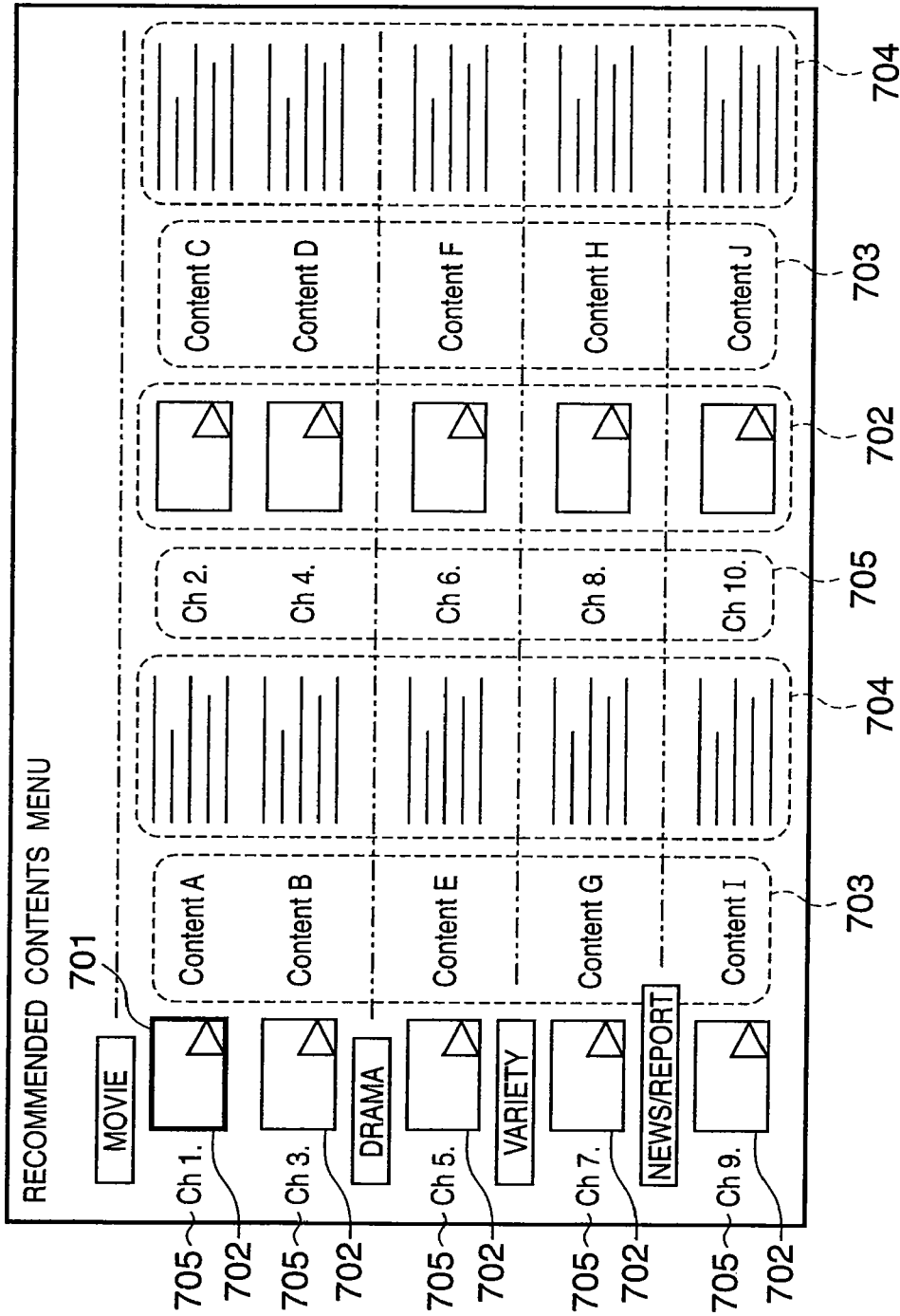
FIG. 10 shows an example of the contents menu screen according to the first embodiment of the present invention.

Upon receipt of the contents menu screen data, control is passed to step S513, and the CPU 104 transmits the received data to the screen configuration unit 107 which configures the screen data to be displayed on the image display unit 113, and the configured screen data is displayed on the image display unit 113 through the display control unit 108. FIG. 10 shows an example of a display of a contents menu screen displayed when the set button 303 or 403 is pressed when the cursor 601 is in the position shown in FIG. 9.

In FIG. 10, a cursor 701 is configured and controlled by the cursor control unit 116. A still image 702 corresponds to one scene of each content. A content name 703 is the name of each content. Introductory text 704 describes each content. A user can roughly select desired contents while watching the menu screen of the streaming contents. A channel number 705 is assigned to each streaming content in the data receiving apparatus 201. For example, content A is assigned ch1, content B is assigned ch3, content I is assigned ch9, and content J is assigned ch10.

A user can select a desired streaming content by pressing the set button 303 or 403 of the operation unit 110 or the remote controller 112 when the cursor is at the corresponding position. The desired streaming contents can be also selected by pressing the ten-key 313 or 413 corresponding to the channel number assigned to the content.

In step S516, the related information about the contents displayed on the contents menu screen is requested.

The Web server 202 receives a data request from the data receiving apparatus 201 (YES in step S601 shown in FIG. 6), recognizes it as a request for the contents related information (YES in step S606), and transmits the requested contents related information in step S607.

The contents related information transmitted from the Web server 202 necessarily includes the URL (uniform resource locator) containing the streaming contents. Depending on the contents, a URL can include the information such as:
  Description about the title of the streaming contents
  Description about the streaming contents
  Category to which the streaming contents belong
  Replay time of the streaming contents
  Bit rate of the streaming contents The data receiving apparatus 201 awaits the contents related information in step S519, and receives the contents related information transmitted from the Web server 202. For example, in the screen display state shown in FIG. 10, ten contents (content. A, content B, . . . , content I, content J) are displayed. In this case, ten pieces of contents related information are acquired.

When all contents related information is acquired, the CPU 104 of the data receiving apparatus 201 analyzes all of the acquired contents related information (step S520), and detects the URL information about the location of each streaming content. After analyzing all contents related information, the zapping stream, which is the feature of the present invention, is configured according to the detected URL information (step S525).

The process of configuring the zapping stream performed in step S525 is explained below by referring to the flowchart shown in FIG. 7. The configuration of the zapping stream is performed by the streaming contents reconfiguration unit 103.

In step S700 shown in FIG. 7, the streaming contents reconfiguration unit 103 selects contents data to be acquired according to the URL information detected in the analysis of the contents related information performed by the CPU 104 in step S520, and issues a data acquire instruction to the CPU 104. In the case shown in FIG. 10, a data acquisition instruction is issued for the contents A to J. These contents are located in an accumulation unit 800 of the contents distribution server 203 as shown in FIG. 11.

In step S701, the CPU 104 issues a contents data request to the contents distribution server 203 in response to the data acquisition instruction from the streaming contents reconfiguration unit 103.

Each time the contents distribution server 203 receives a request from the data receiving apparatus 201 (YES in step S801 of FIG. 8), it transmits the requested data in step S802.

The streaming contents reconfiguration unit 103 of the data receiving apparatus 201 awaits the contents data from the contents distribution server 203 in step S702, and control is passed to step S703 when it receives the data. Data request in step S701 and data reception in step S702 are repeatedly performed until the amount of received data of each streaming content reaches a predetermined amount (until YES in step S703). The amount of data acquired from each streaming content for configuration of the zapping stream is, for example, 6 Mbytes for each content. In the screen display state shown in FIG. 10, ten contents A to J are displayed, and the amount of data is 6 Mbytes for each of the contents A to J. FIG. 11 shows this concept. The contents A to J are stored in the accumulation unit 800 of the contents distribution server 203.

If it is determined that the predetermined amount (for example, 6 Mbytes as described above) has been reached, the data requesting operation is temporarily stopped in step S704. Then, in step S705, it is determined whether or not the configuration of the zapping stream has been completed. The completion of the configuration of the zapping stream is, when the image as shown in FIG. 10 is displayed, to receive all 6-Mbyte parts (partial data A' to J') from the contents A to J as shown in FIG. 11, and store them in the accumulation unit 102. The group of the partial data A' to J' is a zapping stream 811. Therefore, the operations in steps S701 to S705 are repeated until the configuration of the zapping stream contents is completed.

After the completion of the configuration of the zapping stream (YES in step S705), supplementary information 812 relating to the configured zapping stream is generated in step S706. FIG. 12 shows an example of the zapping stream supplementary information. The supplementary information 812 is formed by the contents menu data acquired in step S512 shown in FIG. 5, the contents related information acquired in step S519, and the header information about the streaming contents acquired in step S702 shown in FIG. 7, and described in the XML (eXtensible Markup Language). From the supplementary information 812, it is possible to identify the following information about the configured zapping stream:
  Name assigned to the configured zapping stream
  (data described in the tag in FIG. 12);
  Number of streaming contents forming a zapping stream
  (data described in the tag in FIG. 12);
    File size of a zapping stream (unit: byte)
  (data described in the tag in FIG. 12); and
    Valid time of a zapping stream (unit: second)
  (data described in the tag in FIG. 12);
  or the information about each of the original streaming contents forming the zapping stream including:
    Index number (hexadecimal value) representing the position in the zapping stream
  (data described in the tag in FIG. 12);
    Name of the original streaming content
  (data described in the tag in FIG. 12);
    Description of the original streaming content
  (data described in the tag in FIG. 12);
    Category of the original streaming content
  (data described in the tag in FIG. 12);
    Bit rate of the original streaming content
  (data described in the tag in FIG. 12);
    URL of the original streaming content
  (data described in the tag in FIG. 12); and
    Size of the file received from the original streaming content
  (data described in the tag in FIG. 12).

After the completion of the generation of the supplementary information 812 relating to the zapping stream, the streaming contents reconfiguration unit 103 stores the configured supplementary information 812 together with the zapping stream 811 in the accumulation unit 102 in step S707.

The storage medium used as the accumulation unit 102 can be a magnetic storage medium such as a hard disk, etc. or a volatile storage medium such as a large capacity DRAM, etc.

Figure 13:
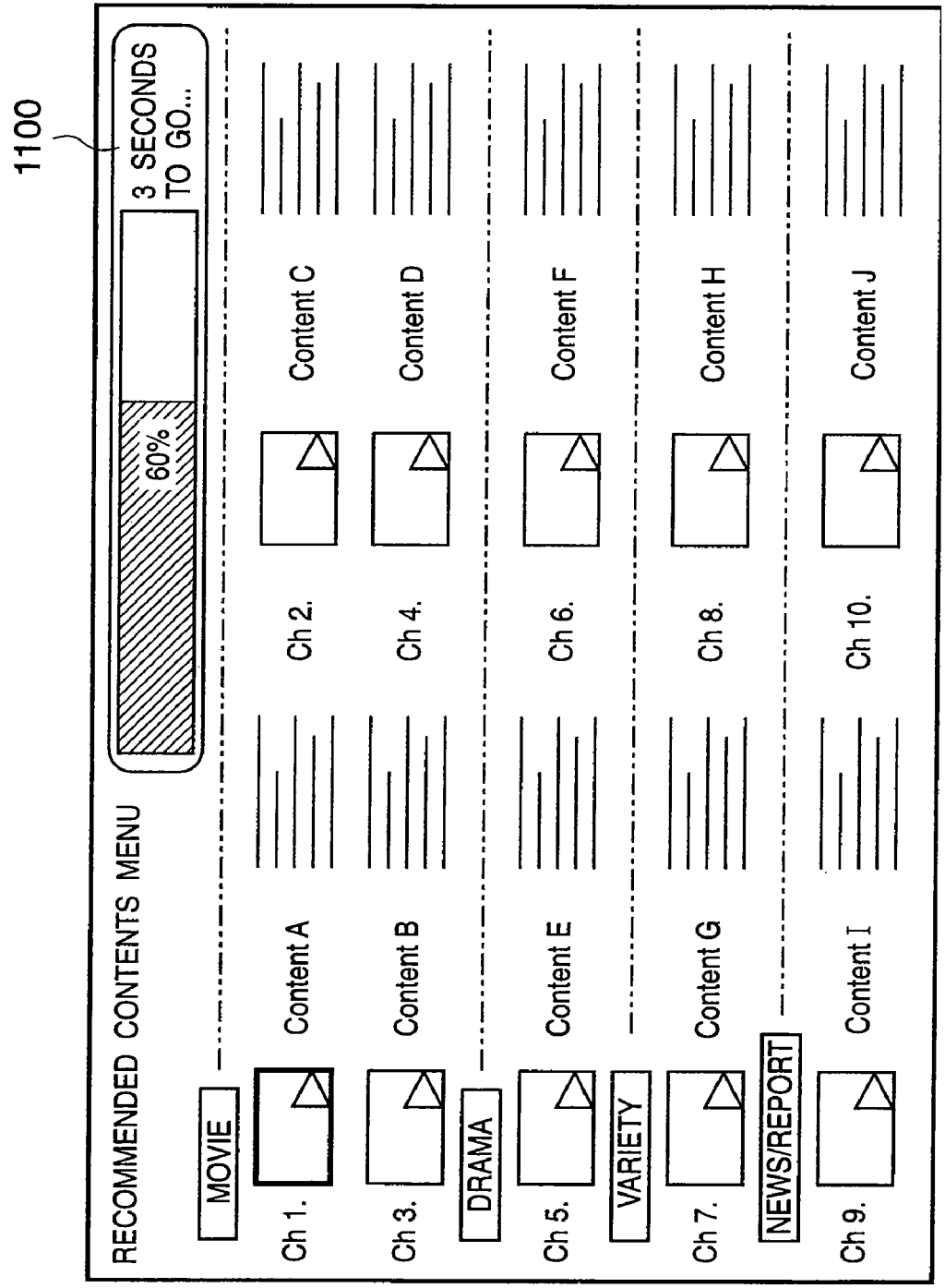
FIG. 13 shows an example of the contents menu screen displayed when the zapping stream is configured according to the first embodiment of the present invention.
Figure 14:
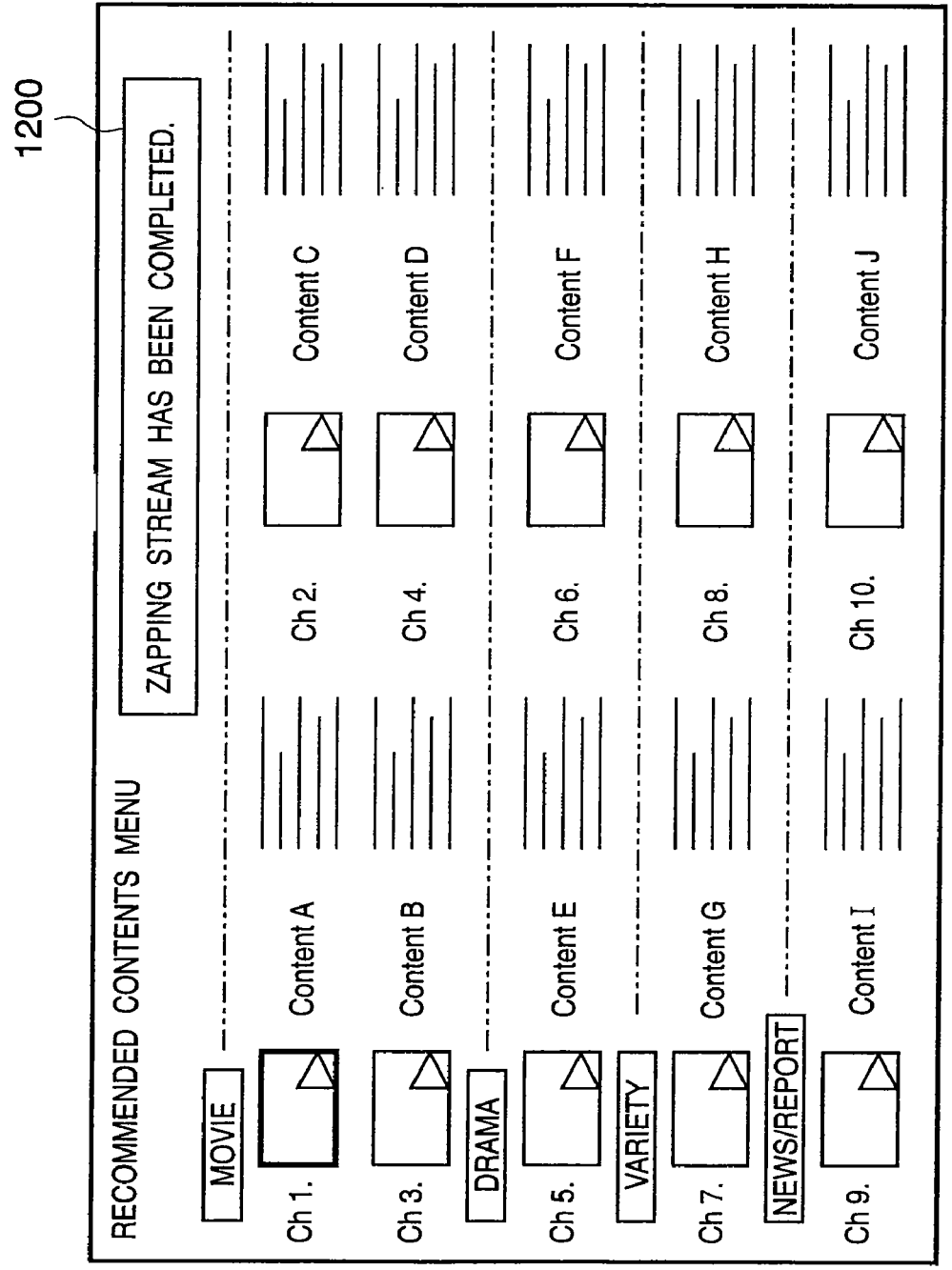
FIG. 14 shows an example of the contents menu screen displayed after the zapping stream has been configured according to the first embodiment of the present invention.

During the configuration of the zapping stream as described above, the user can be notified of the configuration. FIG. 13 shows an example of the displayed screen. In an area 1100, the progress of the configuration of the zapping stream and the time taken to complete the configuration of the zapping stream are displayed. After the zapping stream has been completely configured, a message 1200 notifying that the configuration of the zapping stream has been completed is displayed as shown in FIG. 14. In the example shown in FIG. 14, the notification to the user is made using a text message, but an icon can be displayed to represent the similar meaning.

When the zapping stream configuring process is completed in step S525 shown in FIG. 5, the contents replay process is performed in step S526.

The contents replay process performed in step S526 is described below by referring to the flowcharts shown in FIGS. 15 and 16.

In step S101, when the user operates the button of the operation unit 110 or the remote controller 112 while watching the contents menu screen such as the one shown in FIG. 10 or 14, the data receiving apparatus 201 receives an operation event, and the CPU 104 determines in step S102 whether the received event refers to a press of the set button 303 or 403, the replay button 306 or 406, the ten-key 313 or 413, or the channel up/down button 312 or 412. If any of the above-mentioned buttons is not pressed (NO in step S102), then the display corresponding to the pressed button is performed on the image display unit 113 through the cursor control unit 116, the screen configuration unit 107, and the display control unit 108, control is returned to step S101, and the next event is awaited. If YES in step S102, then the contents to be replayed have been selected, and control is passed to step S103.

In step S103, counting the continuous service hour for the selected contents is started. Then, in step S104, the CPU 104 reads the supplementary information 812 and the zapping stream 811 configured as described above and stored in the accumulation unit 102. According to the supplementary information 812 stored in the accumulation unit 102, a file position of a desired contents stream in the accumulation unit 102 is obtained and the replay of the contents in the position is started. The zapping stream data read from the accumulation unit 102 is transmitted to the video decoder 105 and the voice decoder 106, and the data is decoded. The video data is output through the display control unit 108 and the image display unit 113, and the voice data is output through the voice control unit 109 and the voice output unit 114 (step S105).

In step S106, it is determined whether or not the continuous service hour has exceeded the predetermined time T1. If yes, control is passed to the process shown in FIG. 16. If not, control is passed to step S107. The predetermined time T1 is set shorter than the replay end time of the 6-Mbyte data portion of each content of the zapping stream 811 because a preparation period is required before completing the replay of 6-Mbyte data to switch the display to data acquired from the contents distribution server 203 when the content is continuously watched.

In step S107, it is determined whether or not the operations of various buttons of the operation unit 110 or the remote controller 112 have been performed. If not, control is returned to step S104, and the replay of the contents being replayed is continued. On the other hand, if any operation has been performed, then it is determined in step S108 whether or not the operation is a press of the stop button 307 or 407. If YES, the replay is stopped, the screen as shown in FIG. 10 or 14 is displayed, and then control is passed to step S527 shown in FIG. 5. On the other hand, if the operation is not a press of the stop button 307 or 407, it is determined in step S109 whether or not the operation is a press of the corresponding channel number on the ten-key 313 or 413, or a press of the channel up/down button 312 or 412. If NO, control is returned to step S104, and the replay of the contents being replayed is continued. If the operation is a press of any of the above-mentioned buttons, then control is returned to step S103, the count of the continuous service hour is newly started, and the above-mentioned processes in and after step S104 are repeated.

The case in which the continuous service hour has exceeded the predetermined time T1 (YES in step S106) is explained below by referring to the flowchart shown in FIG. 16. An example of the case in which a replay is started in the cursor display position (in the state of selecting "content A") shown in FIG. 10 is explained below.

Figure 15:
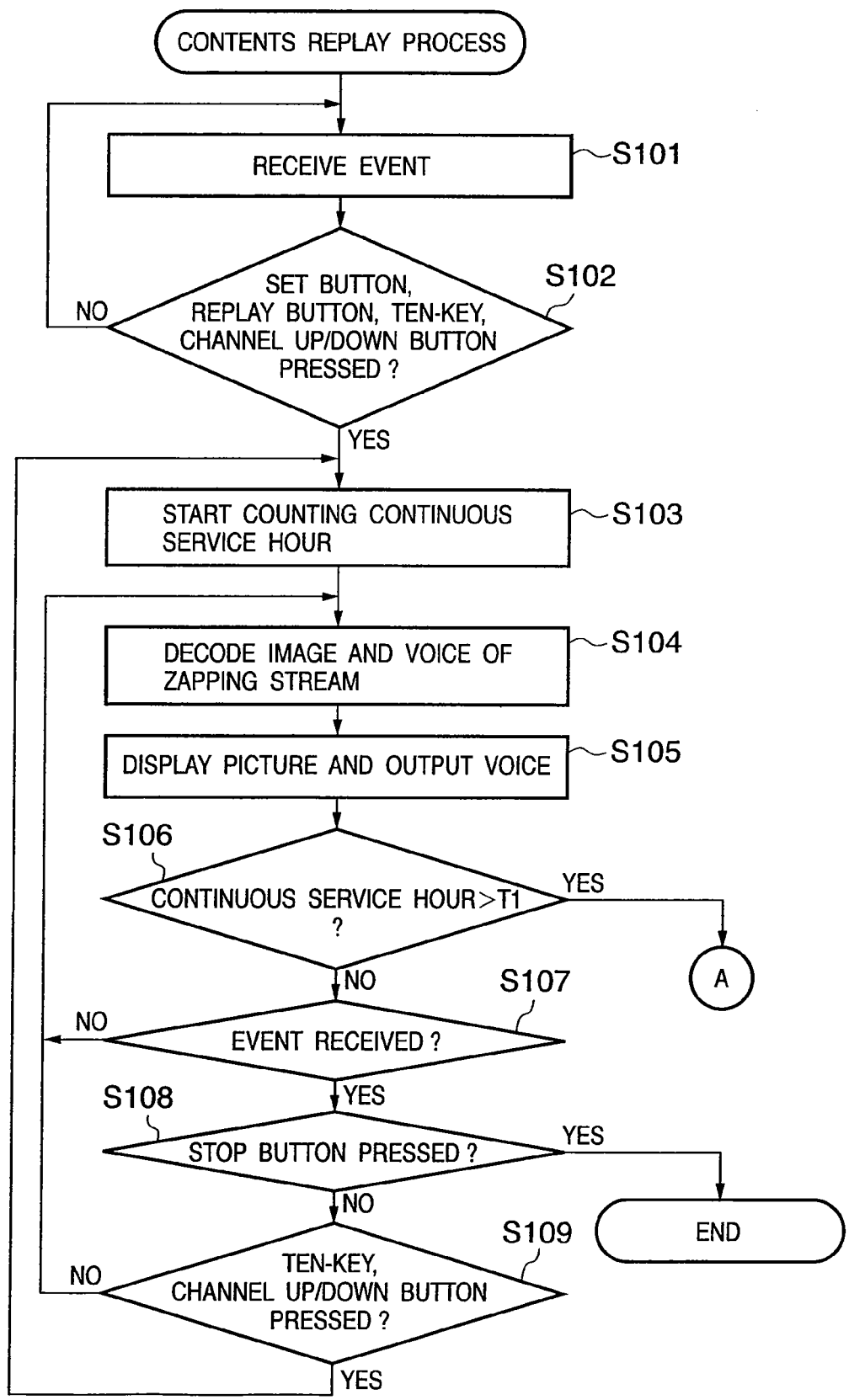
FIG. 15 is a flowchart for explanation of the contents replay process according to the first embodiment of the present invention.
Figure 16:
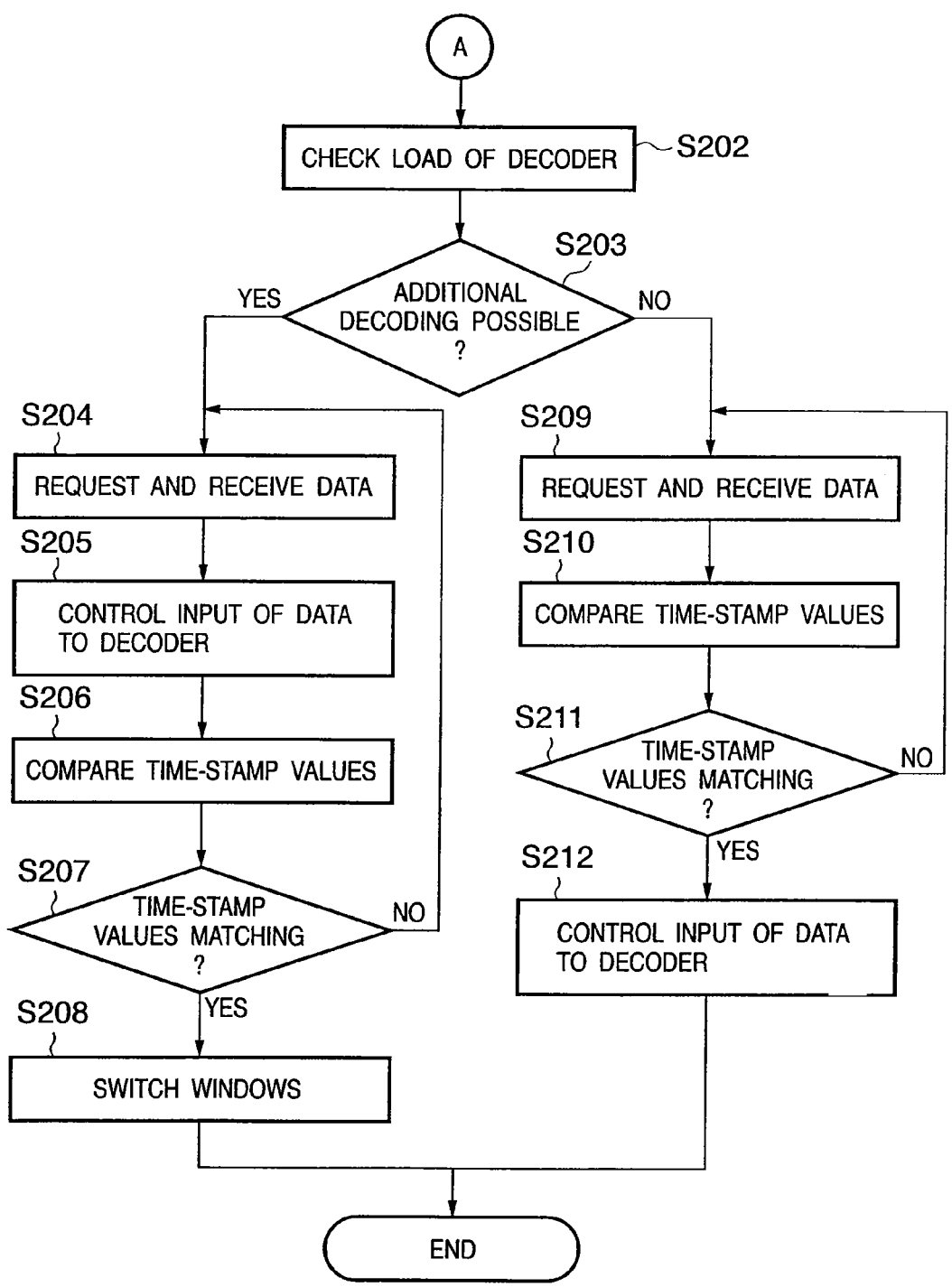
FIG. 16 is a flowchart for explanation of the contents replay process according to the first embodiment of the present invention.

In step S106 shown in FIG. 15, if it is determined that the continuous service hour has exceeded the predetermined time T1, it is considered that the streaming contents (information data) beyond the data portion (partial data A' shown in FIG. 11) of the zapping stream 811 can be continuously watched, and control is passed to the process in FIG. 16. The CPU 104 checks the load of the decoding operation of the video decoder 105 in step S202. In step S202, whether or not the video decoder 105 can decode the streaming contents of the content A to be received hereinafter is checked.

If one of the first video decoder 105a and the second video decoder 105b of the video decoder 105 (let us assume the first video decoder 105a) decodes the partial data A' of the zapping stream 811, and the other (the second video decoder 105b) is not decoding data, then it is determined in step S203 that the data can be decoded additionally.

Figure 17:
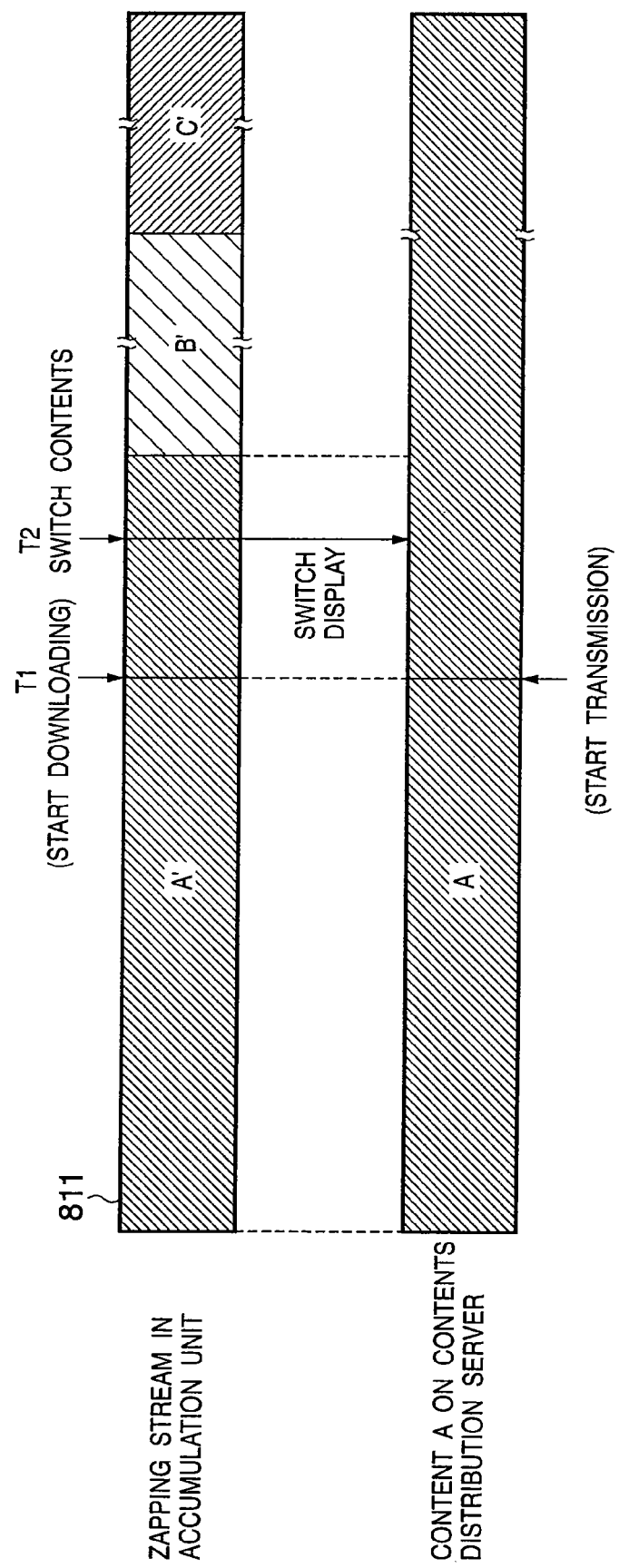
FIG. 17 shows the concept of the zapping stream and the state of the content A data of the contents distribution server according to the first embodiment of the present invention.

If it is determined that the data can be further decoded, then the CPU 104 instructs the communications control unit 100 to start receiving data in step S204. Thus, the communications control unit 100 issues a transmission request for the content A (information data) from the point corresponding to the partial data A' being replayed, to the contents distribution server 203. Upon receipt of the transmission request, the contents distribution server 203 starts transmitting data to the data receiving apparatus 201, and the data receiving apparatus 201 receives data by the communications control unit 100. FIG. 17 is a view showing the zapping stream 118 and the concept of the state of the data of the content A of the contents distribution server 203, and shows the state of starting the distribution of the content A if the time T1 has passed.

The data received by the communications control unit 100 is temporarily buffered in an area of the buffer 101 assigned for contents data additionally received from the contents distribution server 203 for continuous replay of the remaining data (information data) of and after the partial data accumulated for a zapping stream by the buffer control unit 102. The buffered data is transmitted to the video decoder 105 through the decoder switch control unit 117.

In step S205, the decoder switch control unit 117 switches the input data for a plurality of decoders (first video decoder 105a and second video decoder 105b) in the video decoder 105. As described above, when the partial data A' of the zapping stream 811 is decoded by the first video decoder 105a, and the streaming contents (content A) being received is decoded by the second video decoder 105b, the data buffered in the buffer 101 is transmitted to the second video decoder 105b. The data decoded by the first and second video decoders 105a and 105b is transmitted to the display control unit 108.

In step S206, the synchronous control unit 118 acquires the time-stamp information contained in each piece of contents data decoded by the decoders 105a and 105b of the video decoder 105, and compares the time-stamp values. A time stamp refers to time information used in synchronously outputting video data and voice data in streaming contents. The operations in steps S204 to S207 are repeated until the time-stamp values match (until YES in step S207). When the time-stamp values match, control is passed to step S208. In FIG. 17, it is represented by the time T2.

Figure 18:
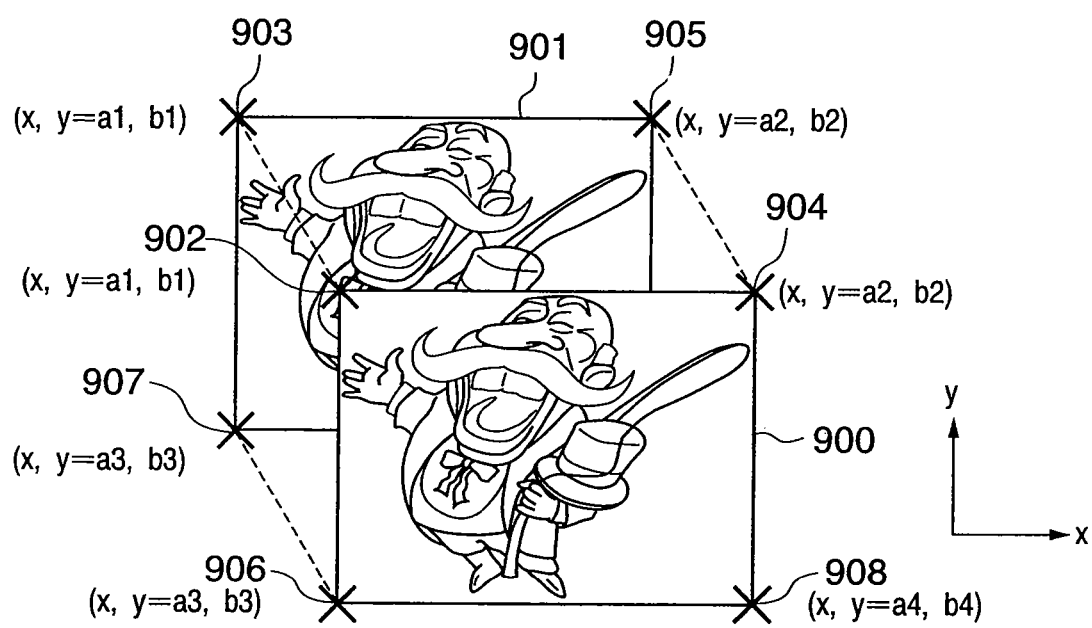
FIG. 18 is a schematic chart of the window display control status immediately before matching of a time-stamp according to the first embodiment of the present invention.

FIG. 18 is a schematic chart showing a window display control state immediately before the matching of time-stamp values in step S207.

FIG. 18 shows a displayed picture 900 in the first window 113a, a displayed picture 901 in the second window 113b, coordinates 902 of the upper left corner of the first window 113a, coordinates 903 of the upper left corner of the second window 113b, coordinates 904 of the upper right corner of the first window 113a, coordinates 905 of the upper right corner of the second window 113b, coordinates 906 of the lower left corner of the first window 113a, coordinates 907 of the lower left corner of the second window 113b, and coordinates 908 of the lower right corner of the first window 113a.

The coordinate positions on the display screen of the coordinates 902 of the upper left corner of the first window 113a and the coordinates 903 of the upper left corner of the second window 113b are the same. Similarly, the coordinates positions on the display screen of the coordinates 904 of the upper right corner of the first window 113a and the coordinates 905 of the upper right corner of the second window 113b, the coordinates positions of the coordinates 906 of the lower left corner of the first window 113a and the coordinates 907 of the lower left corner of the second window 113b, and the positions of the coordinates 908 of the lower right corner of the first window 113a and the coordinates of the lower right corner (not shown) of the second window 113b are the same. That is, the display position of the displayed picture 900 of the first window 113a completely overlaps the displayed picture 901 of the second window 113b, and the priority of the first window 113a is set higher at this stage. Therefore, from the user, only the displayed picture 900 of the first window 113a, that is, the image acquired by decoding the data of the zapping stream 811 can be watched.

When the time-stamp value match each other, control is passed to step S208, and the CPU 104 controls the decoder switch control unit 117. Thus, the display priorities are exchanged between the displayed picture 900 of the first window 113a and the displayed picture 901 of the second window 113b. With this control, the user can watch only the displayed picture 901 of the second window 113b. Thus, the data of the zapping stream 811 (for example, the partial data such as the picture at the commencement of a program) and the data of the streaming contents being received from the contents distribution server 203 and replayed (information data related to the partial data, for example, the information data such as a picture in and after the commencement of the program) can be smoothly exchanged. Subsequently, the data of the streaming contents from the contents distribution server 203 is displayed.

On the other hand, the case in which it is determined in the check of the load of the decoder in step S202 that the data cannot be additionally decoded is described. For example, the case can be set such that another application in the data receiving apparatus 201 according to the first embodiment decodes the other contents stored in the accumulation unit 102 using the first video decoder 105a, and the zapping stream is decoded by the second video decoder 105b, etc.

If it is determined in step S203 that the data cannot be additionally decoded, then, in step S209, a request to transmit data of the content A is issued to the contents distribution server 203, and the contents distribution server 203 starts transmitting data to the data receiving apparatus 201, and the data receiving apparatus 201 receives data by the communications control unit 100. The data received by the communications control unit 100 is temporarily stored in the buffer 101 through the buffer control unit 121.

In step S210, the synchronous control unit 118 acquires the time-stamp information contained in the data of the zapping stream and the time-stamp information contained in the contents data input to the buffer control unit 121, and compares the time-stamp values. The operations in steps S209 to S211 are repeated until the time-stamp values match (until YES in step S211). When the time-stamp values match, control is passed to step S212.

In step S212, the decoder switch control unit 117 switches the data to be transmitted to the video decoder 105 from the data of the zapping stream 811 to the contents data input from the buffer 101, that is, the data of the content A received from the contents distribution server 203 and buffered. With this control, the input data to the second video decoder 105b is switched into the data of the content A, and the zapping stream and the streaming contents received from the contents distribution server 203 and being replayed can be smoothly switched.

When a press of the stop button 307 or 407 is performed by the operation unit 110 or the remote controller 112 during the operation shown in FIG. 16, the operation is interrupted at any time, control is passed to step S527 shown in FIG. 5. When the ten-key 313 or 413, or the channel up/down button 312 or 412 is pressed, control is returned to step S103 shown in FIG. 15.

In the above-mentioned process, for example, if the user presses "+" of the channel up/down button 312 or 412 during the replay of the content A and the partial data A' of the zapping stream 811, the data is switched to the partial data B' of the zapping stream 811 corresponding to the content B. Subsequently, when the user presses "−" of the channel up/down button 312 or 412, the data is switched to the partial data A' of the zapping stream 811. Thus, when contents is switched to other contents during the replay of a selected content, the streaming contents data after the switching of contents is not requested to the Web server 202 and the contents distribution server 203, but the zapping stream 811 is replayed from a file position where a partial data of the desired content is located according to the information in the zapping stream supplementary information 812 stored in the accumulation unit 102. Therefore, since the access time for communications of data with the Web server 202 and the contents distribution server 203 is not required, the contents to be watched can be smoothly and easily switched, thereby reducing the user discomfort.

Figure 19:
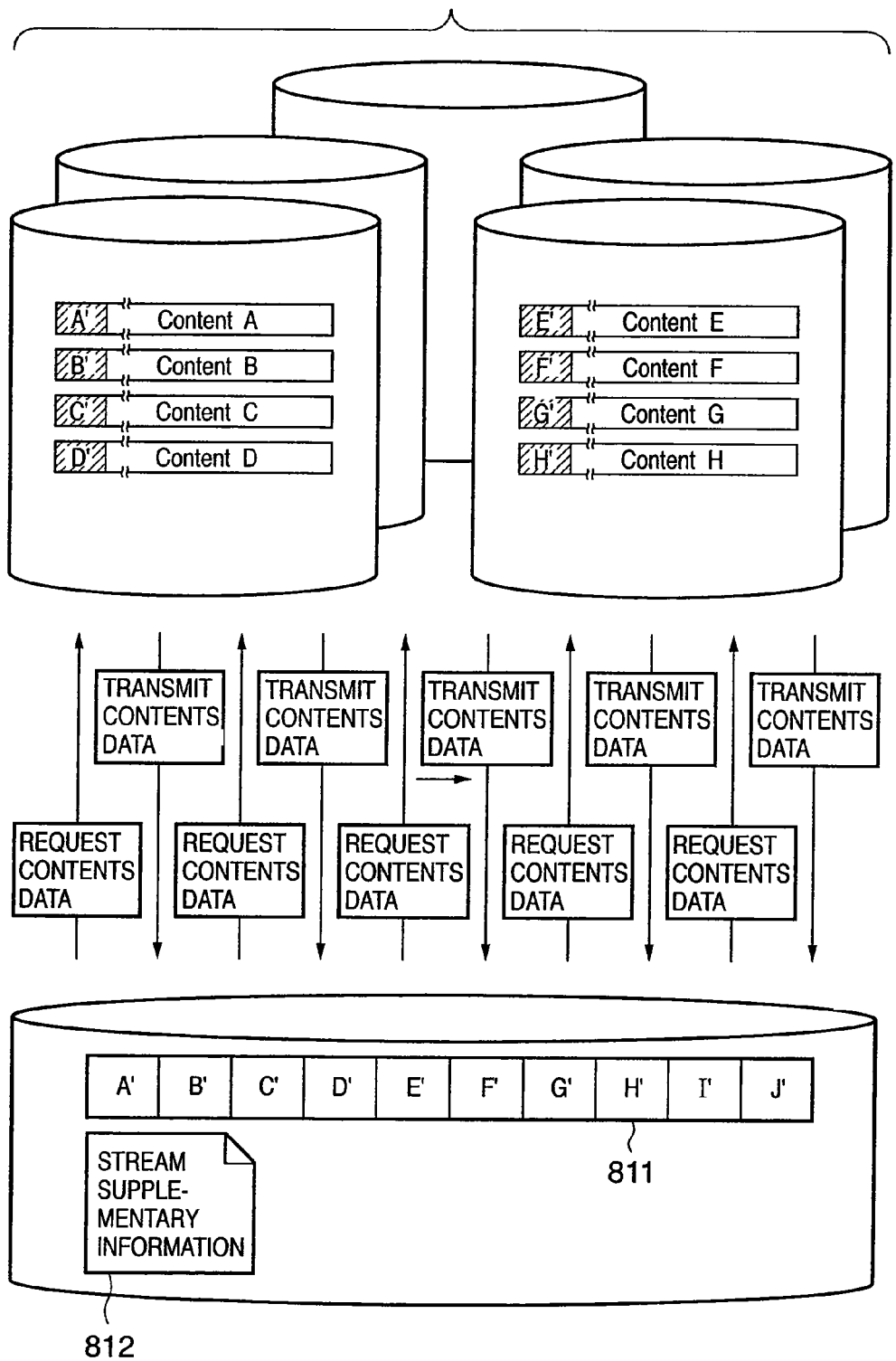
FIG. 19 shows another concept of configuration of the zapping stream according to the first embodiment of the present invention.

Furthermore, as shown in FIG. 19, although the streaming contents contained in the category (FIG. 9) of the streaming portal are scattered in a plurality of contents distribution servers, the address of the request for the contents can be easily discriminated according to the URL information acquired in step S520 shown in FIG. 5. Therefore, the zapping stream can be configured in the same procedure shown in FIG. 7, and data can be replayed with the same effect as in acquiring the data from one contents distribution server.

The operation of a contents up/down button 305 or 405 and the ten-key 313 or 413 switches contents to be watched.

When, for example, a switch to the content B is performed while watching the contents of the partial data A' of the zapping stream 811, and control is returned to the content A, a replay can be resumed from the point where the previous watching was interrupted if the two switching operations have been performed within a predetermined time.

Second Embodiment

Described below is the second embodiment of the present invention.

The configuration of the entire data receiving apparatus and the system according to the second embodiment is the same as in the first embodiment described above by referring to FIGS. 1 and 2.

Figure 20:
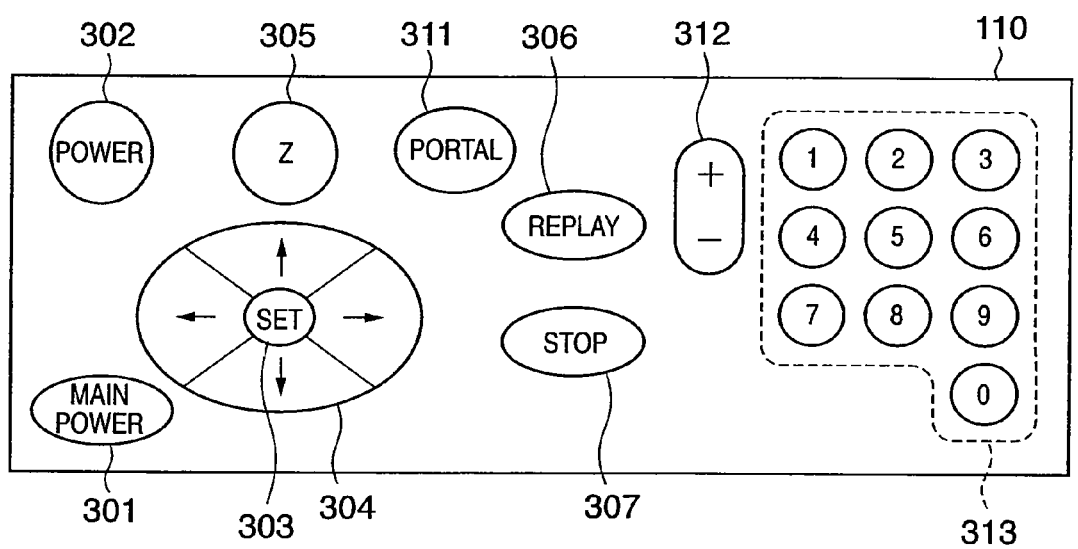
FIG. 20 shows the configuration of an operation unit according to a second embodiment of the present invention.
Figure 21:
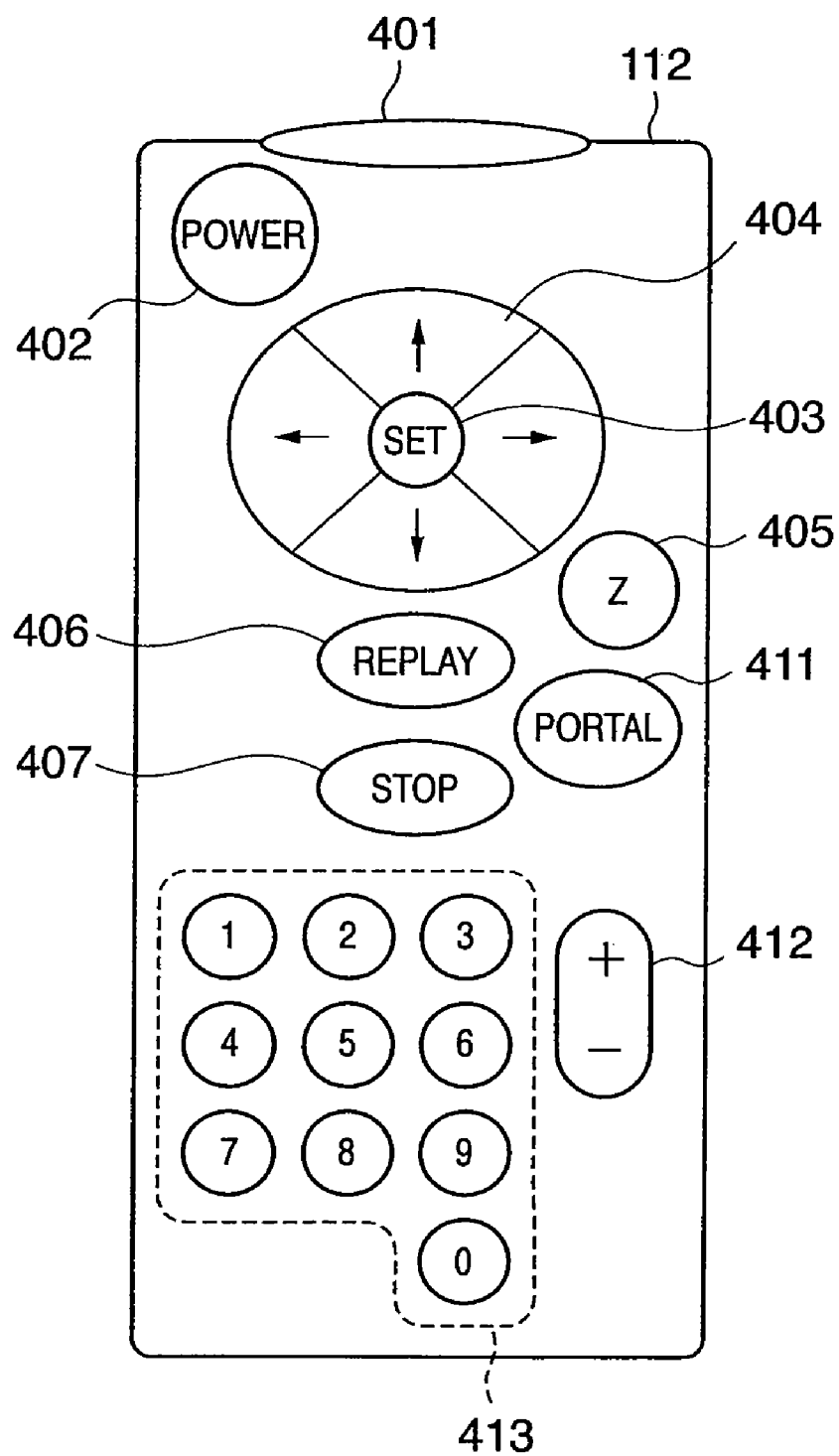
FIG. 21 shows the configuration of a remote controller according to the second embodiment of the present invention.

FIGS. 20 and 21 show the configuration of the operation unit 110 and the remote controller 112. They are different from FIGS. 3 and 4 in that the zapping buttons 305 and 405 are added, but other components are the same as those shown in FIGS. 3 and 4. Therefore, the same reference numerals are assigned to the corresponding components, and the detailed explanation is omitted here.

Figure 22:
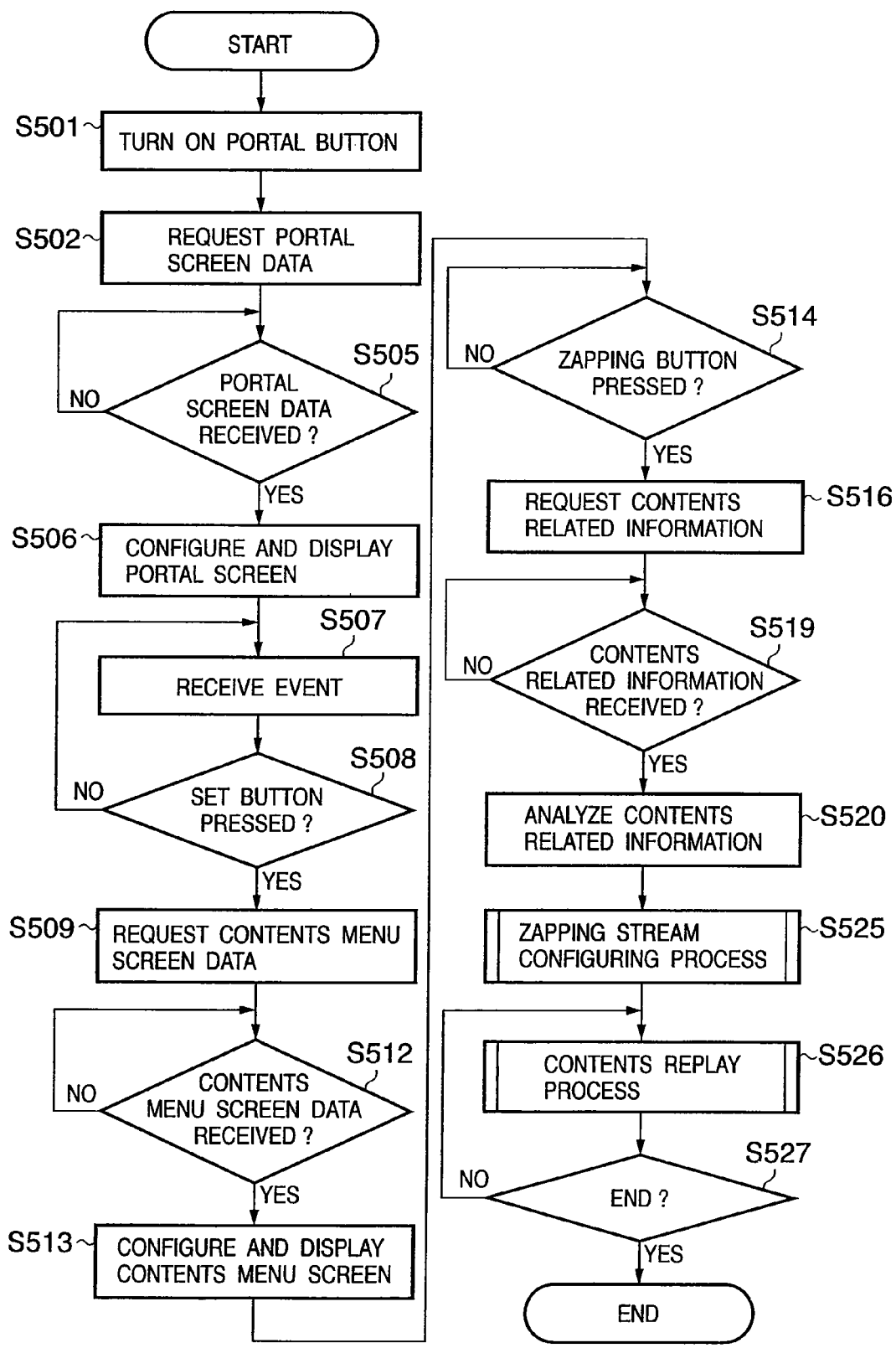
FIG. 22 is a flowchart of the operation of the data receiving apparatus according to the second embodiment of the present invention.

FIG. 22 is a flowchart of the operation of the data receiving apparatus 201 according to the second embodiment of the present invention.

In the above-mentioned first embodiment, control is passed directly to step S516 and the zapping stream configuring operation is started immediately after configuring and displaying the contents menu screen in step S513 shown in FIG. 5. However, in the second embodiment, as shown in FIG. 22, after configuring and displaying the contents menu screen in step S513, a press of the zapping button 305 or 405 is awaited. After detecting the press of the zapping button 305 or 405, control is passed to step S516, and the zapping stream configuring operation is performed. It is possible to control such that when displaying of the contents is designated before a press of the zapping button 305 or 405, a display process is performed under the control similar to that in the conventional technology. With the above-mentioned configuration, when a user knows a desired content in advance, the zapping stream configuring time can be omitted.

Third Embodiment

Described-below is the third embodiment of the present invention.

The configuration of the data receiving apparatus and the entire system according to the third embodiment of the present invention is the same as that explained above in the first embodiment by referring to FIGS. 1 and 2.

Figure 23:
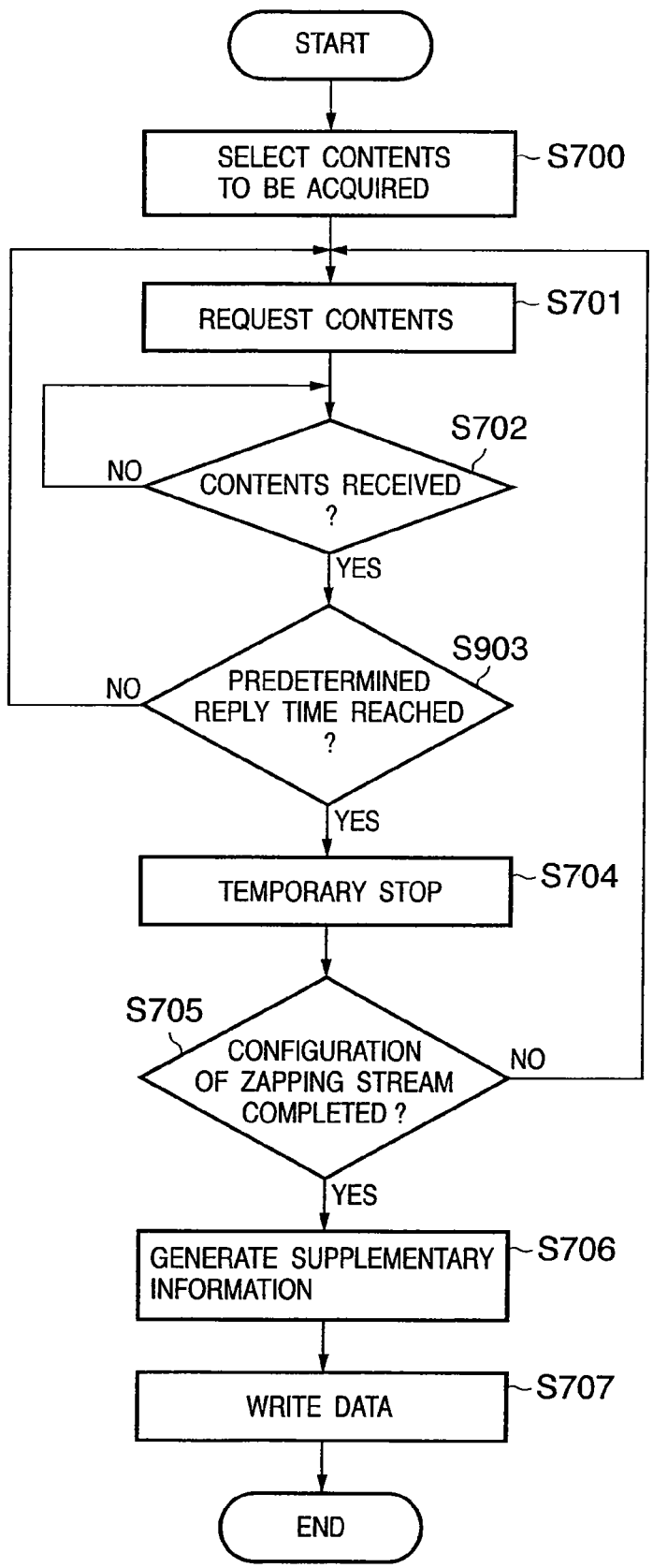
FIG. 23 is a flowchart of the process of configuring the zapping stream according to a third embodiment of the present invention.

FIG. 23 is a flowchart of the zapping stream configuring process (process in step S525 shown in FIG. 5) performed by the data receiving apparatus 201 according to the third embodiment of the present invention.

In the process shown in FIG. 7 according to the first embodiment, the amount of data acquired from each of the streaming contents A to J for configuration of a zapping stream is constant. In contrast, the third embodiment aims at setting a constant replay time of the partial data acquired from each of the streaming contents A to J. In FIG. 23, the process similar to that shown in FIG. 7 is assigned the same reference numeral, and the detailed explanation is omitted here.

Upon receipt of the data from the contents distribution server 203 in step S702, the streaming contents reconfiguration unit 103 repeats requesting of data in step S701 and receiving of data in step S702 until the replay time of each streaming content received in step S903 reaches the amount of data corresponding to a predetermined replay time. In this case, the amount of received data can be determined according to the bit rate information contained in the received contents data or the bit rate information possibly contained in the contents related information data acquired in advance. For example, when the amount of data acquired from each of the streaming contents A to J for configuration of a zapping stream is set for three minutes, the time is divided by a bit rate to calculate the necessary amount of data, thereby making determination in step S903.

Fourth Embodiment

Described below is the fourth embodiment of the present invention.

According to the fourth embodiment, another switch control is performed from the partial data of the zapping stream to the streaming contents distributed by the contents distribution server 203. In the fourth embodiment, a low brightness level frame or a field is selected from the decoded zapping stream video data, and a timing of switching from the zapping stream to the streaming contents received from the contents distribution server 203 is determined.

Figure 24:
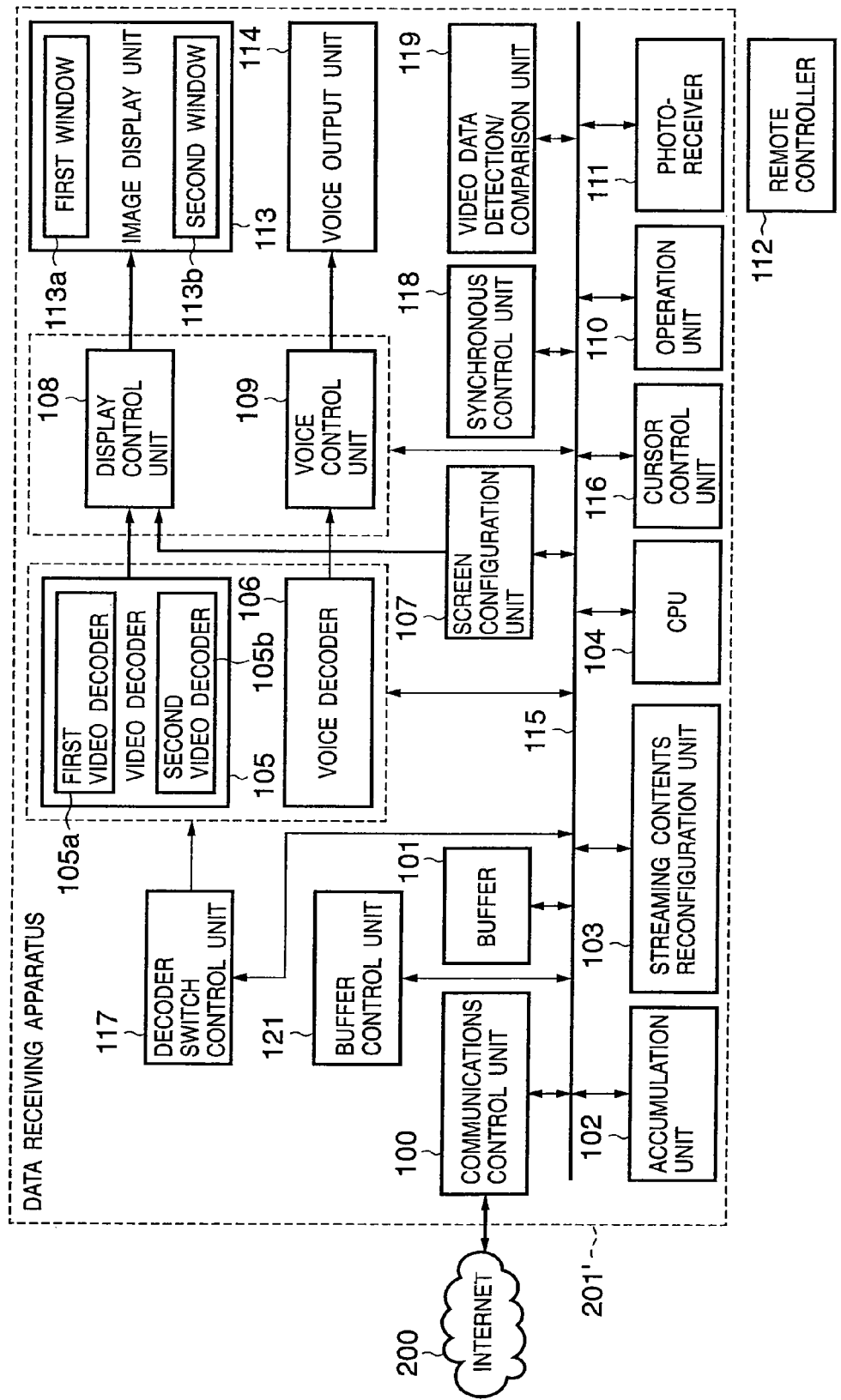
FIG. 24 is a block diagram of the entire configuration of the data receiving apparatus according to a fourth embodiment of the present invention.

FIG. 24 is a block diagram of the entire configuration of the data receiving apparatus 201' according to the fourth embodiment of the present invention. It is different from FIG. 1 in that a video data detection/comparison unit 119 is added, but it is the same as FIG. 1 in the other components assigned the same reference numerals. The explanation of the same components is omitted here.

Figure 25:
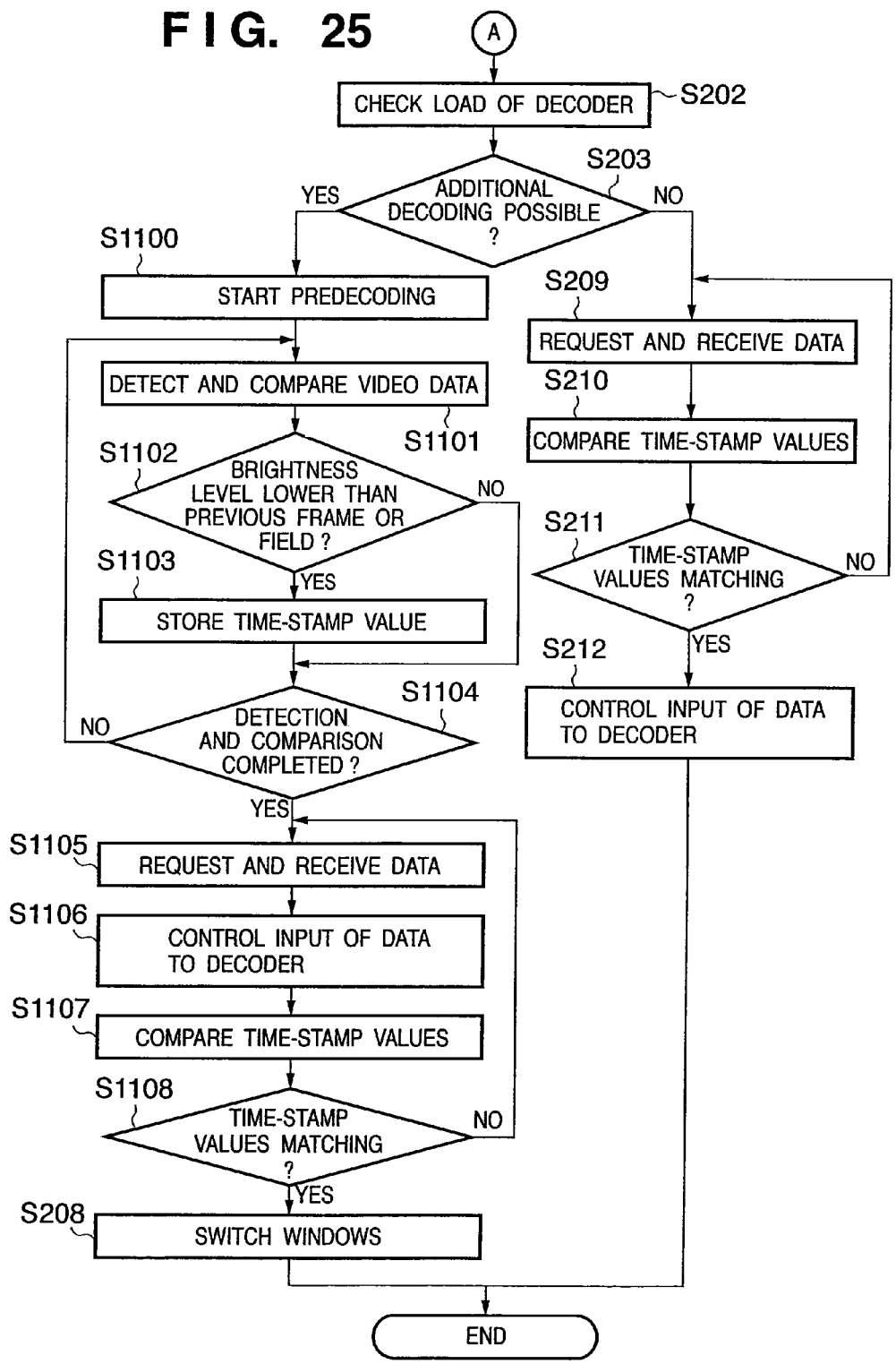
FIG. 25 is a flowchart of the contents replay process according to the fourth embodiment of the present invention.

FIG. 25 shows the contents replay process according to the fourth embodiment of the present invention. Since the process performed when the continuous service hour is T1 or less is the same as that explained above by referring to FIG. 15, the explanation is omitted here.

As explained above in step S106 shown in FIG. 15, if it is determined that the continuous service hour has exceeded a predetermined time T1, control is passed to the process shown in FIG. 25 by considering that the streaming contents beyond the data portion (for example, the partial data A' shown in FIG. 11) of the zapping stream 811 can be continuously watched. The CPU 104 checks the load of the decoding operation of the video decoder 105 in step S202. In step S202, whether or not the video decoder 105 can decode the streaming contents of the content A to be received hereinafter is checked.

If one of the first video decoder 105a and the second video decoder 105b of the video decoder 105 (let us assume the first video decoder 105a) decodes the partial data A' of the zapping stream 811, and the other (the second video decoder 105b) is not decoding data, then it is determined in step S203 that the data can be decoded additionally.

If it is determined that the data can be additionally decoded, then decoding of the partial data A' of the zapping stream 811 is started using the second video decoder 105b from the contents display switch probable point (for example, T2 shown in FIG. 17) in step S1100.

Then, in step S1101, the frame or filed of decoded video data is detected using the picture data detection/comparison unit 119, and is compared with the video data in the preceding frame or field. The comparison of the video data is performed to detect a frame or a field of a lower brightness level.

In step S1102, if it is determined that the data of a newly detected frame or field is lower in brightness level than the picture data of the preceding frame of field, then the timestamp value of the frame of field is stored in step S1103, and control is passed to step S1104. If it is not determined that the brightness level is lower, control is passed directly to step S1104.

It is determined in step S1104 on the partial data (for example, the partial data A') of the zapping stream 811 at and after the contents switch probable point T2 whether or not the process of detecting the frame or field of partial data and comparing the data with the picture data of the previous frame or field has been completed. If not, then control is returned to step S1101, and the processes in steps S1101 to S1104 are repeated. If YES, then control is passed to step S1105.

In step S1105, the contents distribution server 203 is requested to transmit the data of the content A from the point (for example, T1 shown in FIG. 17) corresponding to the partial data A' being replayed. Upon receipt of the transmission request, the contents distribution server 203 starts transmitting data to the data receiving apparatus 201', and the data receiving apparatus 201' receives data by the communications control unit 100. The data received by the communications control unit 100 is temporarily buffered in an area of the buffer 101 assigned for contents data.

In step S1106, the decoder switch control unit 117 switches the input data for a plurality of decoders (first video decoder 105a and second video decoder 105b) in the video decoder 105. As described above, when the partial data A' of the zapping stream 811 is decoded by the first video decoder 105a, and the streaming contents (content A) being received is decoded by the second video decoder 105b, the data buffered in the buffer 101 is transmitted to the second video decoder 105b. The data decoded by the first and second video decoders 105a and 105b in the video decoder 105 is transmitted to the display control unit 108.

In step S1107, the synchronous control unit 118 acquires the time-stamp information contained in each piece of contents data decoded by the decoders 105a and 105b of the video decoder 105, and compares the time-stamp information with the time-stamp value stored in step S1103. When the time-stamp values match, control is passed to step S208, and the display is switched. The switching control in step S208 is the same as that according to the first embodiment, and the detailed explanation is omitted here.

If it is determined in step S203 that the data cannot be further decoded, then the processes in steps S209 to 212 are performed as in the first embodiment explained by referring to FIG. 16.

Thus, in the fourth embodiment, display windows can be more smoothly and less conspicuously switched at a timing of a frame or a field of a low brightness level.

Fifth Embodiment

Described below is the fifth embodiment of the present invention.

In the fifth embodiment, when streaming data to be processed is encoded in the MPEG2 or MPEG4 systems, a movement vector contained in the picture data being decoded is detected and compared, a frame or a field having a smaller movement for each frame or field is selected, and the timing of switching from the zapping stream to the streaming contents received from the contents distribution server 203 is determined.

Figure 26:
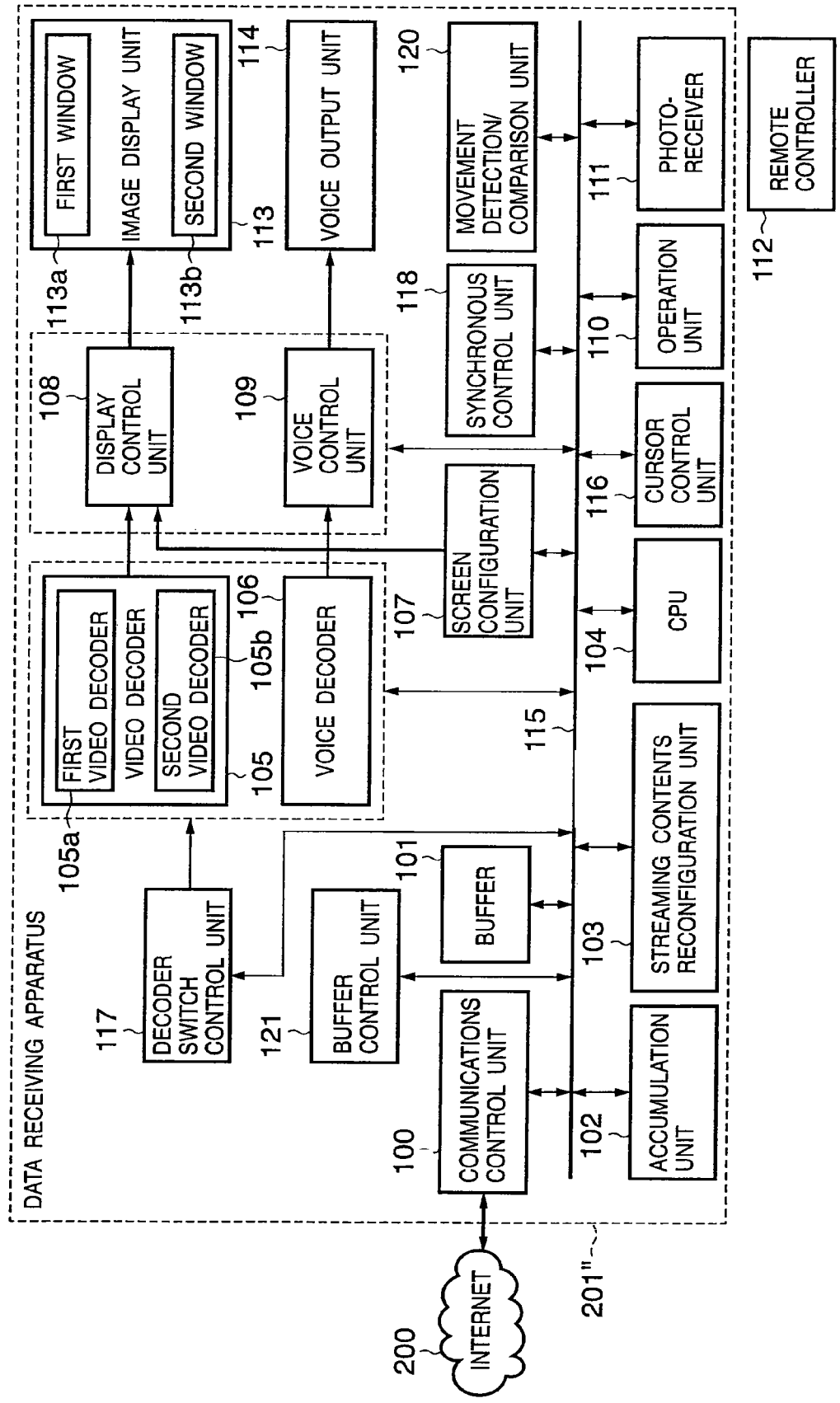
FIG. 26 is a block diagram of the entire configuration of the data receiving apparatus according to a fifth embodiment of the present invention.

FIG. 26 is a block diagram of the entire configuration of the data receiving apparatus 201" according to the fifth embodiment of the present invention. It is different from FIG. 1 in that a movement detection/comparison unit 120 is added, but other configuration is the same as that shown in FIG. 1. Therefore, the same reference numerals are assigned, and the explanation is omitted here.

FIG. 27 shows the contents replay process according to the fifth embodiment. Since the process in which the continuous service hour is T1 or less is the same as that shown in FIG. 15, the explanation is omitted here.

As explained above in step S106 shown in FIG. 15, if it is determined that the continuous service hour has exceeded the predetermined time T1, it is considered that the streaming contents (information data) beyond the data portion (partial data A' shown in FIG. 11) of the zapping stream 811 can be continuously watched, and control is passed to the process in FIG. 27. The CPU 104 checks the load of the decoding operation of the video decoder 105 in step S202. In step S202, whether or not the video decoder 105 can decode the streaming contents of the content A to be received hereinafter is checked.

If one of the first video decoder 105a and the second video decoder 105b of the video decoder 105 (let us assume the first video decoder 105a) decodes the partial data A' of the zapping stream 811, and the other (the second video decoder 105b) is not decoding data, then it is determined in step S203 that the data can be decoded additionally.

If it is determined that the data can be additionally decoded, then decoding of the partial data A' of the zapping stream 811 is started using the second video decoder 105b from the contents display switch probable point (for example, T2 shown in FIG. 17) in step S1300.

Then, in step S1301, a movement vector is detected using the frame or field of decoded video data and its preceding frame or field of video data, and is compared with a movement vector obtained in the preceding movement vector detection process by the movement detection/comparison unit 120. The comparison of the video data is performed to detect a frame or a field of a lower movement vector.

In step S1302, if it is determined that the newly detected movement vector is smaller than the movement vector obtained in the preceding movement vector detection process, then the time-stamp value of the frame of field is stored in step S1303, and control is passed to step S1304. If it is not determined that the new movement vector is smaller, control is passed directly to step S1304.

It is determined in step S1304 on the partial data (for example, the partial data A') of the zapping stream 811 at and after the contents switch probable point T2 whether or not the process of detecting and comparing movement vectors has been completed. If not, then control is returned to step S1301, and the processes in steps S1301 to S1304 are repeated. If YES, then control is passed to step S1305.

In step S1305, the contents distribution server 203 is requested to transmit the data of the content A from the point (for example, T1 shown in FIG. 17) corresponding to the partial data A' being replayed. Upon receipt of the transmission request, the contents distribution server 203 starts transmitting data to the data receiving apparatus 201", and the data receiving apparatus 201" receives data by the communications control unit 100. The data received by the communications control unit 100 is temporarily buffered in an area of the buffer 101 assigned for contents data.

In step S1306, the decoder switch control unit 117 switches the input data for a plurality of decoders (first video decoder 105a and second video decoder 105b) in the video decoder 105. As described above, when the partial data A' of the zapping stream 811 is decoded by the first video decoder 105a, and the streaming contents (content A) being received is decoded by the second video decoder 105b, the data buffered in the buffer 101 is transmitted to the second video decoder 105b. The data decoded by the first and second video decoders 105a and 105b in the video decoder 105 is transmitted to the display control unit 108.

In step S1307, the synchronous control unit 118 acquires the time-stamp information contained in each piece of contents data decoded by the decoders 105a and 105b of the video decoder 105, and compares the time-stamp information with the time-stamp value stored in step S1303. When the time-stamp values match, control is passed to step S208, and the display is switched. The switching control in step S208 is the same as that according to the first embodiment, and the detailed explanation is omitted here.

If it is determined in step S203 that the data cannot be further decoded, then the processes in steps S209 to 212 are performed as in the first embodiment by referring to FIG. 16.

Thus, in the fifth embodiment, display windows can be more smoothly and less conspicuously switched at a timing of a frame or a field of a small movement.

Other Embodiment

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

In the conventional streaming replay, when a large number of users access the same server to watch streaming contents on the server, the load of the data communications process increases at the server, and there is the possibility of interrupted data from the server.

Additionally, when a user cannot easily select appropriate streaming contents from among a number of contents, the user watches the contents while switching (zapping) a plurality of streaming contents. In this case, the user feels discomfort when the zapping cannot be smoothly performed as in switching TV channels, a replay is interrupted for a long time, etc.

Otherwise, also when a user frequently changes streaming contents in a plurality of servers to watch, the user may feel discomfort if the zapping cannot be smoothly performed as in switching TV channels because the access destinations (servers) which provide streaming contents data have to be switched each time the streaming contents are changed.

According to the first to fifth embodiments described above in detail, all these problems can be solved.

It should be noted that, in the above-mentioned embodiments, partial data and information data are represented by data of a series of programs having continuous portions in time such as a part of pictures in a program and the remaining parts of pictures. However, any partial data and information data which are related to each other can be applied to the present invention.

As many apparently widely different embodiments of the present invention can be made without departing from the spirit and scope thereof, it is to be understood that the invention is not limited to the specific embodiments thereof except as defined in the appended claims.

What is claimed is:

1. A receiving method of receiving streaming content data from a server by communicating with the server via a network, said method comprising:

receiving partial data of a plurality of streaming contents from the server as zapping data, and storing the zapping data of the respective streaming contents in a storage unit;

generating video data by reading out from the storage unit and by decoding by a first decoding unit zapping data of one of the streaming contents selected as a subject to be replayed from the zapping data stored in the storage unit and displaying the generated video data on a display unit;

receiving from the server, if the video data generated from the selected zapping data is continuously displayed on the display unit for more than a predetermined time period, data of the streaming content corresponding to the selected zapping data by communicating with the server via the network;

generating video data by decoding by a second decoding unit the received data of the streaming content corresponding to the selected zapping data; and switching the video data displayed on the display unit from the video data generated from the selected zapping data to the video data generated from the received data of the streaming content wherein in said switching step, a time-stamp of the video data decoded by the first decoding unit and generated from the selected zapping data is sequentially compared with a time-stamp of the video data decoded by the second decoding unit and generated from the received data of the streaming content, and the video data displayed on the display unit is switched at a timing when the two time-stamps match.

2. The receiving method according to claim 1, wherein in said switching step, the video data displayed on the display unit is switched at a frame in which brightness of the video data generated from the selected zapping data is lower than a predetermined threshold.

3. The receiving method according to claim 1, wherein in said switching step, the video data displayed on the display unit is switched at a frame in which movement of video data of the zapping data is smaller than a predetermined movement.

4. A receiving apparatus for receiving streaming content data from a server by communicating with the server via a network, said apparatus comprising:

a communications unit that communicates with the server via the network and receives partial data of a plurality of streaming contents from the server as zapping data;

a storage unit that stores the received zapping data of the respective streaming contents;

a first decoding unit that generates video data by reading out from the storage unit and by decoding zapping data of one of the streaming contents selected as a subject to be replayed from the zapping data stored in the storage unit;

a display control unit that displays the generated image video data on a display unit;

a receiving control unit that controls the communications unit to receive from the server, if the video data generated from the selected zapping data is continuously displayed on the display unit for more than a predetermined time period, data of the streaming content corresponding to the selected zapping data by communicating with the server via the network; and a second decoding unit that generates video data by decoding the received data of the streaming content corresponding to the selected zapping data, wherein said display control unit sequentially compares a time-stamp of the video data decoded by the first decoding unit and generated from the selected zapping data with a time-stamp of the video data decoded by the second decoding unit and generated from the received data of the streaming content, and switches the video data displayed on the display unit from the video data generated from the selected zapping data to the video data generated from the received data of the streaming content at a timing when the two time-stamps match.

5. The receiving apparatus according to claim 4, wherein said display control unit switches the video data displayed on the display unit at a frame in which brightness of the video data generated from the selected zapping data is lower than a predetermined threshold.

6. The receiving apparatus according to claim 4, wherein said display control unit switches the video data displayed on the display unit at a frame in which movement of video data of the zapping data is smaller than a predetermined movement.

* * * * *